United States Patent
Wagatsuma

(10) Patent No.: US 10,430,133 B2
(45) Date of Patent: Oct. 1, 2019

(54) IMAGE FORMING SYSTEM, CONTROL PROGRAM OF IMAGE FORMING SYSTEM, CONTROL PROGRAM OF IMAGE FORMING APPARATUS, AND CONTROL PROGRAM OF SERVER

(71) Applicant: Konica Minolta, Inc., Chiyoda-ku, Tokyo (JP)

(72) Inventor: Yoshifumi Wagatsuma, Kunitachi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/059,134

(22) Filed: Aug. 9, 2018

(65) Prior Publication Data
US 2019/0065127 A1    Feb. 28, 2019

(30) Foreign Application Priority Data
Aug. 23, 2017 (JP) ................. 2017-160566

(51) Int. Cl.
*G06F 3/12* (2006.01)
*H04N 1/00* (2006.01)
*G03G 15/00* (2006.01)

(52) U.S. Cl.
CPC ....... *G06F 3/1253* (2013.01); *G03G 15/5083* (2013.01); *G03G 15/602* (2013.01); *G03G 15/6508* (2013.01); *G03G 15/6523* (2013.01); *G03G 15/6555* (2013.01); *G06F 3/126* (2013.01); *H04N 1/00244* (2013.01); *G03G 15/6594* (2013.01)

(58) Field of Classification Search
None
See application file for complete search history.

(56) References Cited

U.S. PATENT DOCUMENTS

| 5,384,632 A | * | 1/1995 | Nakajima | G03G 15/50 399/45 |
| 2004/0095587 A1 | * | 5/2004 | Brown | H04N 1/3875 358/1.2 |
| 2009/0185213 A1 | * | 7/2009 | Banton | G03G 15/50 358/1.15 |
| 2010/0053641 A1 | * | 3/2010 | Lofthus | B41J 13/0009 358/1.1 |

(Continued)

FOREIGN PATENT DOCUMENTS

JP    A-2007-070007    3/2007

*Primary Examiner* — Fan Zhang
(74) *Attorney, Agent, or Firm* — Baker Hostetler

(57) ABSTRACT

An image forming system includes: a server accepting a print job from a client apparatus; and an image forming apparatus receiving an order for the print job from the server, the image forming apparatus including: a sheet feeding tray accommodating a sheet; a hardware processor determining to receive an order for a print job accepted by the server when a first and second conditions are satisfied; and an image former forming a page image based on the print job accepted by the server and a page image based on the print job being accepted specifying the sheet of the same size as that of the sheet specified, by allocating the page images in parallel to the sheet of twice the size of the sheet specified, when it is determined by the hardware processor that the order for the print job accepted by the server is received.

20 Claims, 19 Drawing Sheets

(56) References Cited

U.S. PATENT DOCUMENTS

2011/0069329 A1\* 3/2011 Abe .................. G06F 3/1219
                                            358/1.9
2015/0057784 A1\* 2/2015 Butler ............... B29C 67/0088
                                            700/119

\* cited by examiner

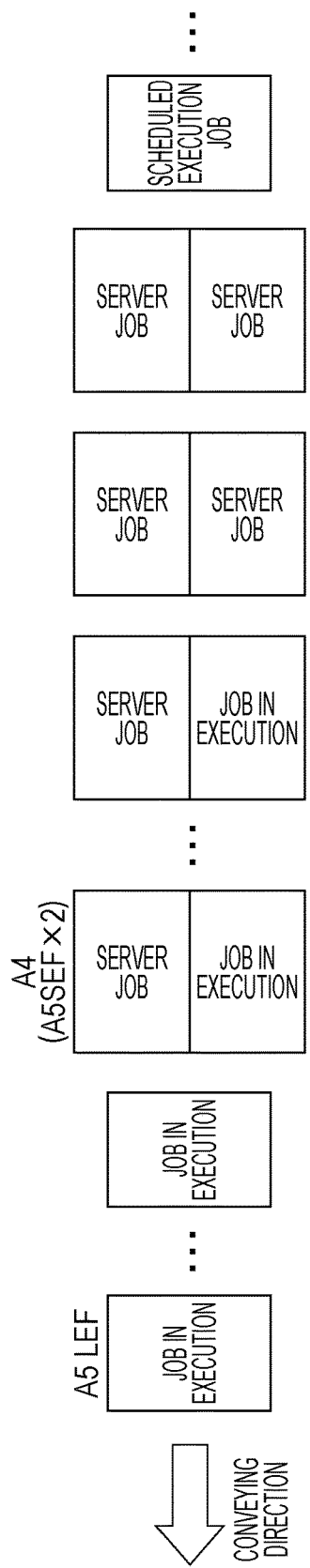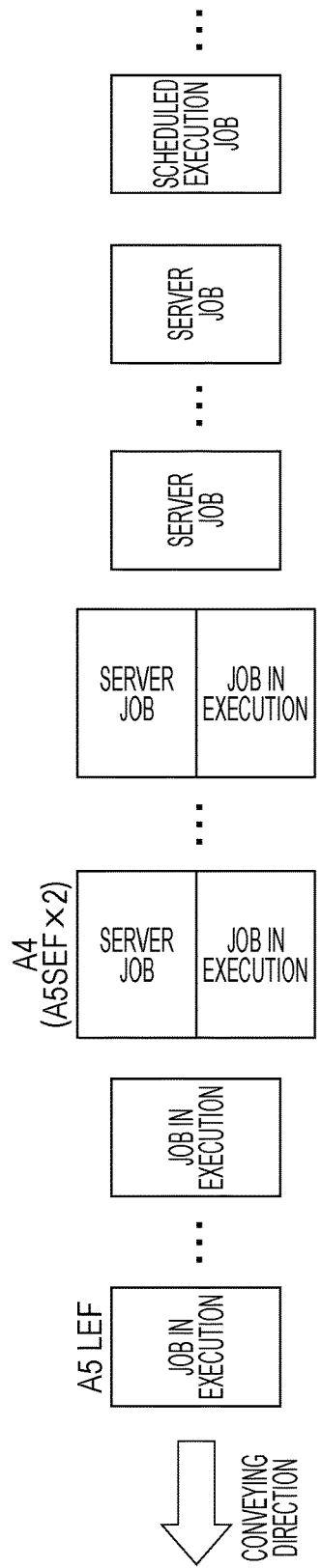

IMAGE FORMING SYSTEM, CONTROL PROGRAM OF IMAGE FORMING SYSTEM, CONTROL PROGRAM OF IMAGE FORMING APPARATUS, AND CONTROL PROGRAM OF SERVER

The entire disclosure of Japanese patent Application No. 2017-160566, filed on Aug. 23, 2017, is incorporated herein by reference in its entirety.

BACKGROUND

Technological Field

The present invention relates to an image forming system, a control program of an image forming system, a control program of an image forming apparatus, and a control program of a server.

Description of the Related Art

An image forming system is known that distributes print jobs to a plurality of image forming apparatuses and causes the image forming apparatuses to execute the print jobs. In a case where such an image forming system is used particularly in commercial and industrial printing fields, each image forming apparatus is required to have high productivity.

In association with the above, for example, JP 2007-70007 A discloses a technique for adjusting allocation of images in accordance with priority of printing when allocating a plurality of images on one recording medium to print. In the technique, the allocation of the images is adjusted by mixing some high-priority print processing in ordinary print processing or by interrupting ordinary print processing with high-priority print processing.

However, with the technique described in JP 2007-70007 A, if an order for the high-priority print processing is received during execution of the ordinary print processing, productivity of the ordinary print processing is lowered. For this reason, for example, in a case where it is not desired to lower the productivity of the ordinary print processing or in a case where a delivery time of the ordinary print processing will not be satisfied as a result of receiving the order for the high-priority print processing, there is a problem that the order cannot be received for the high-priority print processing.

SUMMARY

The present invention has been made in view of the above circumstances, and an object of the present invention is to provide an image forming system, a control program of an image forming system, a control program of an image forming apparatus, and a control program of a server capable of executing an additional print job without lowering productivity of a print job being accepted.

To achieve the abovementioned object, according to an aspect of the present invention, an image forming system reflecting one aspect of the present invention comprises: a server enabled to accept a print job from a client apparatus; and an image forming apparatus enabled to receive an order for the print job from the server, wherein the image forming apparatus includes: a sheet feeding tray that accommodates a sheet; a hardware processor that determines to receive an order for a print job accepted by the server in a case where a first condition and a second condition are both satisfied, the first condition being that a print job accepted by the server specifies a sheet of a same size as a size of a sheet specified by a print job being accepted by the image forming apparatus and at least either being executed or scheduled to be executed, the second condition being that the sheet feeding tray accommodates a sheet of twice the size of the sheet specified; and an image former that forms a page image based on the print job accepted by the server and a page image based on the print job being accepted specifying the sheet of the same size as the size of the sheet specified, by allocating the page images in parallel to the sheet of twice the size of the sheet specified, in a case where it is determined by the hardware processor that the order for the print job accepted by the server is to be received.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 18A is a diagram for explaining various modifications in the server job order reception determination processing;

FIG. 18B is a diagram for explaining various modifications in the server job order reception determination processing;

DETAILED DESCRIPTION OF EMBODIMENTS

Figure 1:
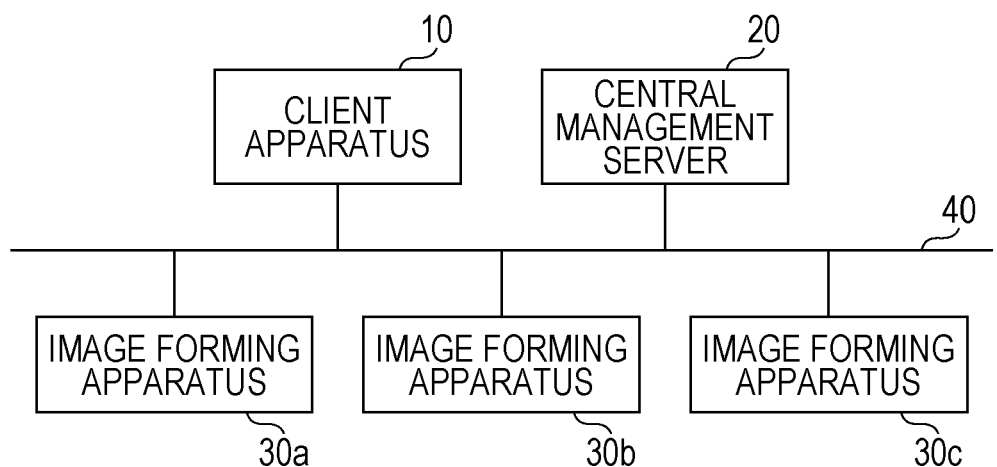
FIG. 1 is a diagram showing a schematic configuration of an image forming system according to a first embodiment.

Hereinafter, one or more embodiments of the present invention will be described with reference to the drawings. However, the scope of the invention is not limited to the disclosed embodiments. Note that, in the description of the drawings, the same elements are denoted by the same reference numerals, and duplicate descriptions will not be provided. In addition, dimensional ratios of the drawings are exaggerated for convenience of description and may be different from actual ratios.

First Embodiment

FIG. 1 is a diagram showing a schematic configuration of an image forming system according to a first embodiment.

<Image Forming System 1>

An image forming system 1 includes a client apparatus 10, a central management server (server) 20, and image forming apparatuses 30a to 30c (hereinafter also collectively referred to as "image forming apparatus 30"). The client apparatus 10, the central management server 20, and the image forming apparatuses 30a to 30c are communicably connected to each other via a network 40 such as the Internet. The image forming apparatuses 30a to 30c may be respectively installed in different printing shops or the like. Note that, the type and the number of apparatuses connected to the network 40 are not limited to the example shown in FIG. 1.

<Client Apparatus 10>

Figure 2:
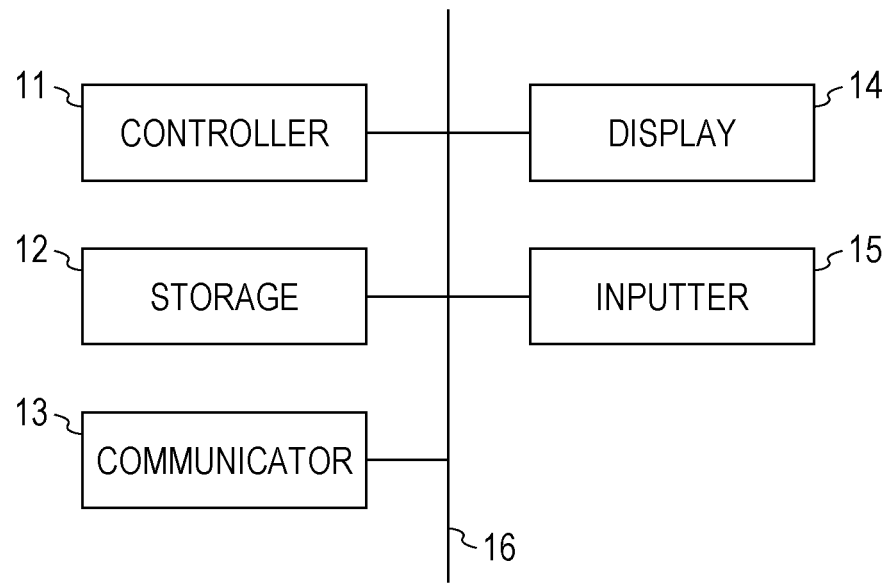
FIG. 2 is a block diagram showing a schematic configuration of a client apparatus.

FIG. 2 is a block diagram showing a schematic configuration of a client apparatus.

The client apparatus 10 includes a controller 11, a storage 12, a communicator 13, a display 14, and an inputter 15. These are communicably connected to each other via a bus 16 for exchanging signals. The client apparatus 10 is, for example, a user's personal computer (PC) or the like, and can transmit a print job to the central management server 20. In the transmitted print job, image data is included, and the size, type, and number of sheets to be used for printing, the delivery time of the print job, and the like can be set.

The controller 11 is a central processing unit (CPU) and executes control of each device and various types of arithmetic processing in accordance with a program.

The storage 12 includes read only memory (ROM) that stores various programs and various data in advance, random access memory (RAM) as a work area that temporarily stores the programs and data, a hard disk that stores various programs and various data, and the like. In the storage 12, a printer driver for generating a print job is installed.

The communicator 13 is an interface for communicating with another apparatus such as the central management server 20.

The display 14 is, for example, a liquid crystal display, and displays various types of information.

The inputter 15 includes a pointing device such as a mouse, a keyboard, and the like, and is used for inputting various instructions.

<Central Management Server 20>

Figure 3:
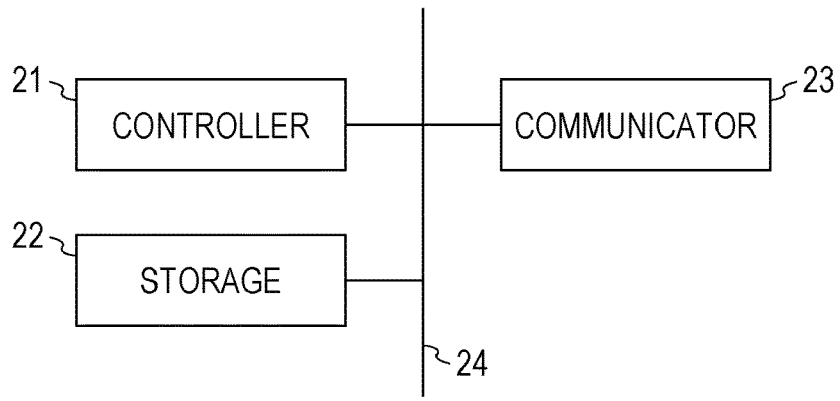
FIG. 3 is a block diagram showing a schematic configuration of a central management server.

FIG. 3 is a block diagram showing a schematic configuration of a central management server.

The central management server 20 includes a controller 21, a storage 22, and a communicator 23. These are communicably connected to each other via a bus 24 for exchanging signals. Since the devices of the central management server 20 respectively have functions similar to those of the devices of the client apparatus 10, the descriptions of the devices will not be repeated. The central management server 20 is enabled to accept a print job from the client apparatus 10 and causes at least one of the plurality of image forming apparatuses 30 to execute the print job.

<Image Forming Apparatus 30>

Figure 4:
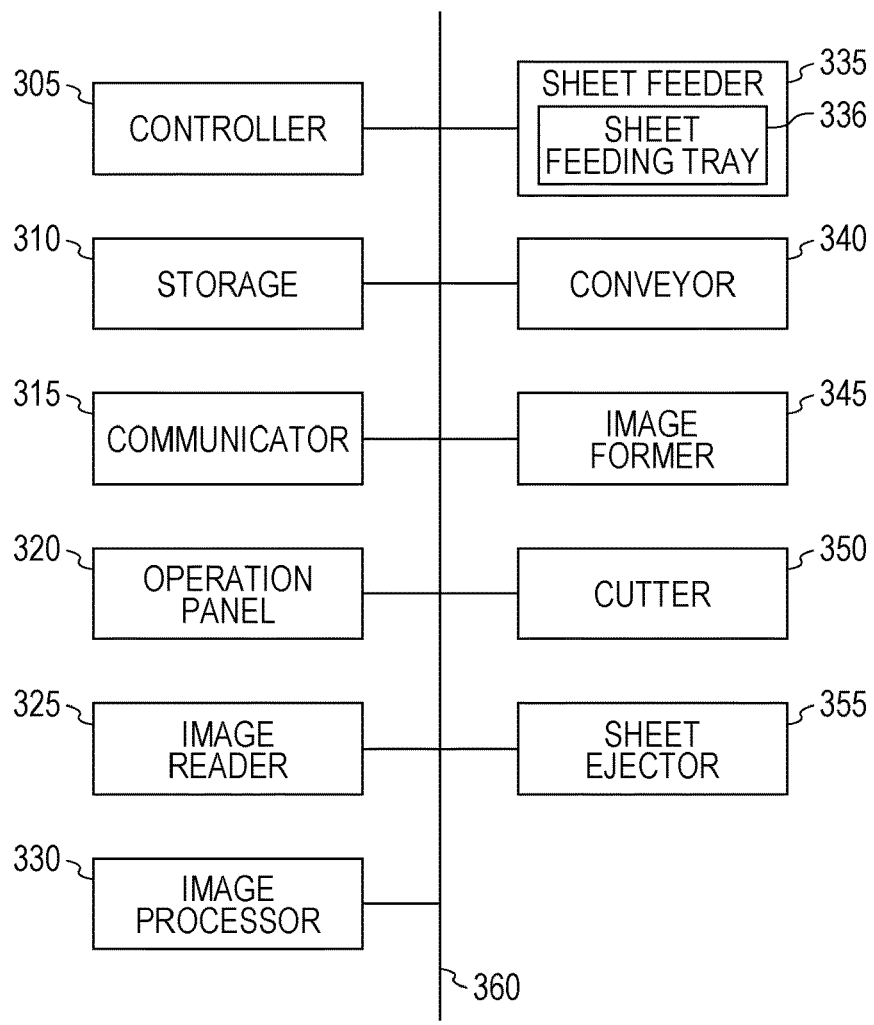
FIG. 4 is a block diagram showing a schematic configuration of an image forming apparatus.

FIG. 4 is a block diagram showing a schematic configuration of an image forming apparatus.

The image forming apparatus 30 (image forming apparatuses 30a to 30c) includes a controller 305, a storage 310, a communicator 315, an operation panel 320, an image reader 325, an image processor 330, a sheet feeder 335, a conveyor 340, an image former 345, a cutter 350, and a sheet ejector 355. These are communicably connected to each other via a bus 360 for exchanging signals. Since the controller 305, the storage 310, and the communicator 315 of the image forming apparatus 30 respectively have functions similar to those of the devices of the client apparatus 10, the descriptions of the devices will not be repeated. The image forming apparatus 30 not only executes a print job directly instructed by an operator (a user of the image forming apparatus 30) of a printing shop or the like, but also can receive and execute an order for a print job presented from the central management server 20.

The operation panel 320 includes a touch panel, a numeric keypad, a start button, a stop button, an LED, and the like, and is used for displaying various types of information and inputting various instructions.

The image reader 325 includes an optical system including a mirror and a lens, and a reading sensor such as a charge coupled device (CCD) image sensor. The image reader 325 reads information printed on a document such as a sheet and converts the information into an image signal that is an electrical signal.

The image processor 330 executes various types of image processing on the image signal acquired from the image reader 325 and the image data included in the print job. For example, the image processor 330 executes rasterizing processing and the like on the image data included in the print job to generate image data in a bitmap format.

The sheet feeder 335 includes a plurality of sheet feeding trays 336 that accommodates various types of sheets used for printing, and feeds the sheets accommodated in the sheet feeding tray 336 one by one.

The conveyor 340 includes a conveying path, a plurality of conveying roller pairs arranged along the conveying path, and a drive motor that drives the conveying roller pairs. The conveyor 340 conveys the sheet fed from the sheet feeder 335 to the image former 345 and the like located on a sheet conveyance downstream side.

The image former 345 forms an image based on the image data included in the print job on a sheet by using a known imaging process such as an electrophotographic process including charging, exposure, development, transfer, and fixing processes. Under the control of the controller 305, the image former 345 can collectively form page images for N pages on one sheet (so-called "N-in-1 printing"). For example, the image former 345 can form page images of two pages of A5 size by allocating the page images in parallel on one sheet of A4 size by 2-in-1 printing.

The cutter 350 cuts the sheet on which the image is formed by the image former 345 into a predetermined size as necessary. For example, the cutter 350 may include a cutter or the like to cut the sheet along a sheet conveying direction as the sheet is conveyed by the conveyor 340. The cutter 350 cuts a sheet on which page images of N pages are formed by N-in-1 printing to divide the sheet into N for each page image. For example, the cutter 350 cuts a sheet of A4 size on which page images of two pages of A5 size are formed to be allocated in parallel by 2-in-1 printing, into two sheets of A5 size along the sheet conveying direction.

The sheet ejector 355 includes a plurality of sheet ejection trays that ejects the sheet on which an image is formed by the image former 345 and cut by the cutter 350 as necessary, and ejects the sheet one by one to the outside of the image forming apparatus 30.

Note that, the client apparatus 10, the central management server 20, and the image forming apparatus 30 may include constituents other than the above-described constituents, or does not have to include some of the above-described constituents. For example, the image forming apparatus 30 does not have to include the cutter 350, and instead, an external post-processing apparatus located on the sheet conveyance downstream side may include a cutter.

<Processing of Image Forming System 1>

Next, a procedure will be described of processing of the image forming system 1. In the processing of the image forming system 1, control is performed to execute an additional print job without lowering the productivity of the print job being accepted.

Figure 5A:
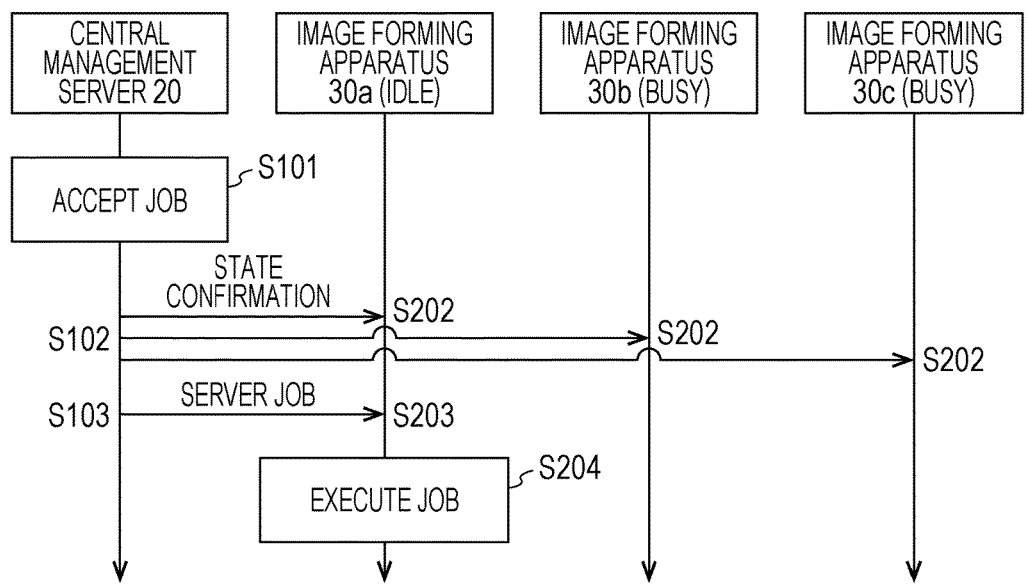
FIG. 5A is a diagram showing a relationship of processing between the central management server and image forming apparatuses.
Figure 5B:
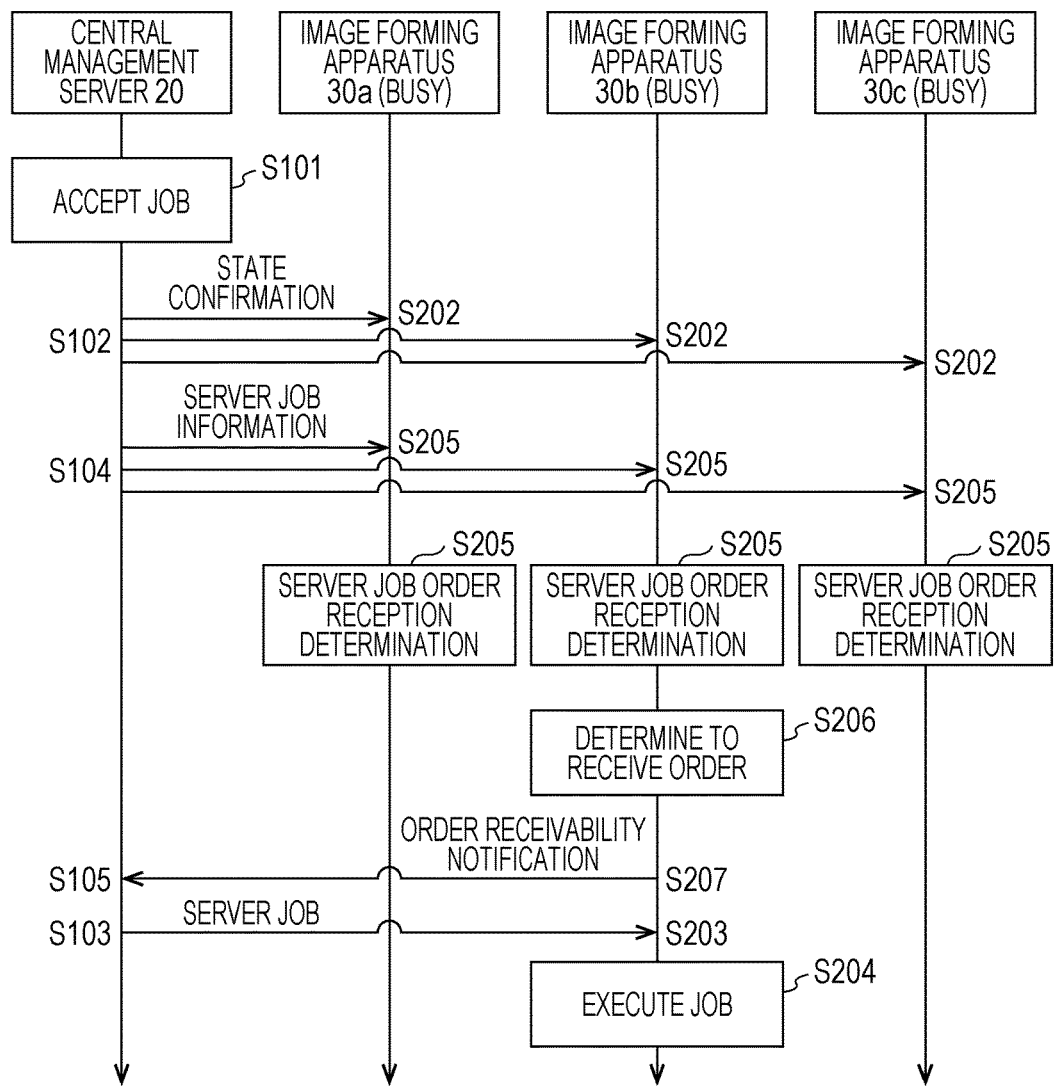
FIG. 5B is a diagram showing a relationship of processing between the central management server and the image forming apparatuses.

FIGS. 5A and 5B are diagrams each showing a relationship of processing between the central management server and the image forming apparatuses.

As shown in FIGS. 5A and 5B, the central management server 20 and the image forming apparatuses 30a to 30c perform processing while communicating with each other as time passes. The processing indicated by each step number such as "S101" in FIGS. 5A and 5B corresponds to the processing indicated by each step number in FIGS. 6 and 7 described later. In addition, in FIGS. 5A and 5B, the client apparatus 10 is not illustrated.

FIG. 5A shows a flow of the processing in a case where there is an image forming apparatus 30 in an idle state under the management of the central management server 20 when the central management server 20 accepts a print job from the client apparatus 10. First, when accepting the print job from the client apparatus 10, the central management server 20 confirms whether or not the image forming apparatuses 30a to 30c are in the idle state. Here, the "idle state" means a state in which a print job is not being executed. In the example shown in FIG. 5A, the central management server 20 confirms that the image forming apparatus 30a is in the idle state, and presents the print job accepted by the central management server 20 (hereinafter referred to as "server job") to the image forming apparatus 30a in the idle state. Then, the image forming apparatus 30a receives and executes an order for the server job. In this case, the image forming apparatus 30a can execute the server job for which the order is received, by using idle time of a schedule of the print job of the image forming apparatus 30a.

On the other hand, FIG. 5B shows a flow of the processing in a case where there is no image forming apparatus 30 in the idle state under the management of the central management server 20 when the central management server 20 accepts a print job from the client apparatus 10. First, when accepting the print job from the client apparatus 10, the central management server 20 confirms whether or not the image forming apparatuses 30a to 30c are in the idle state. In the example shown in FIG. 5B, since there is no image forming apparatus 30 in the idle state, the central management server 20 does not present a server job at this time. Instead, the central management server 20 transmits server job information to the image forming apparatuses 30a to 30c. The server job information includes information such as the size and type of a sheet specified by the server job.

On the basis of the received information, each of the image forming apparatuses 30a to 30c determines whether or not to receive an order for the server job from the central management server 20. In the example shown in FIG. 5B, the image forming apparatus 30b determines to receive the order for the server job. The image forming apparatus 30b transmits a notification indicating that the order for the server job can be received (hereinafter referred to as "order receivability notification") to the central management server 20. Upon receiving the order receivability notification from the image forming apparatus 30b, the central management server 20 presents the server job to the image forming apparatus 30b. Then, the image forming apparatus 30b receives and executes the order for the server job.

As described above, in the first embodiment, the central management server 20 presents the server job to the image forming apparatus 30 in the idle state or the image forming apparatus 30 that has transmitted the order receivability notification. In the following, details will be described of the processing of the central management server 20 and the image forming apparatus 30. Note that, in the present embodiment, it is assumed that the server job and the print job being accepted by the image forming apparatus 30 each specify 1-in-1 printing. In the following, the print job being accepted by the image forming apparatus 30 is referred to as "image forming apparatus job". That is, the image forming apparatus job means a print job being accepted registered in a job queue of the image forming apparatus 30 (image forming apparatus).

<Processing of Central Management Server 20>

Figure 6:
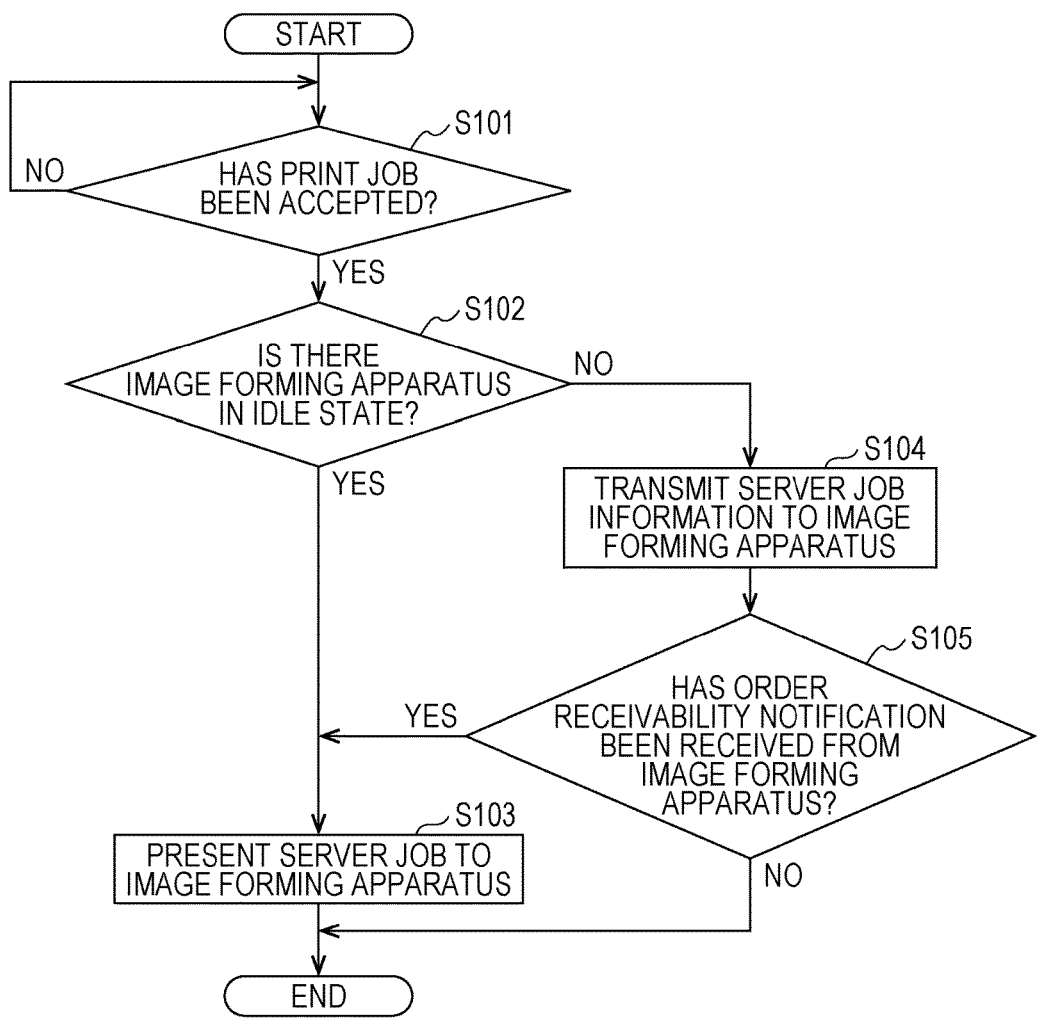
FIG. 6 is a flowchart showing a procedure of processing executed in the central management server.

FIG. 6 is a flowchart showing a procedure of processing executed in the central management server.

An algorithm shown in the flowchart of FIG. 6 is stored as a program in the storage 22 of the central management server 20, and is executed by the controller 21. The controller 21 reads the program and executes the processing, thereby controlling operation of each device of the central management server 20.

As shown in FIG. 6, first, the controller 21 of the central management server 20 determines whether or not a print job has been accepted from the external client apparatus 10 (step S101).

In a case where the print job has not been accepted (step S101: NO), the controller 21 executes ordinary processing while continuing to monitor whether or not the print job has been accepted.

In a case where the print job has been accepted (step S101: YES), the controller 21 determines whether or not there is an image forming apparatus 30 in the idle state under the management of the central management server 20 (step S102).

In a case where there is an image forming apparatus 30 in the idle state (step S102: YES), the controller 21 presents a server job to the image forming apparatus 30 in the idle state (step S103). The controller 21 presents the server job, thereby causing the image forming apparatus 30 to execute the sewer job. Then, the controller 21 ends the processing.

In a case where there is no image forming apparatus 30 in the idle state (step S102: NO), the controller 21 transmits server job information to each image forming apparatus 30 (step S104).

Subsequently, the controller 21 determines whether or not an order receivability notification has been received from the image forming apparatus 30 (step S105).

In a case where the order receivability notification has been received (step S105: YES), the controller 21 presents the server job to the image forming apparatus 30 that has transmitted the order receivability notification (step S103). Then, the controller 21 ends the processing.

In a case where the order receivability notification has not been received (step S105: NO), the controller 21 does not present the server job to the image forming apparatus 30 and ends the processing.

<Processing of Image Forming Apparatus 30>

Figure 7:
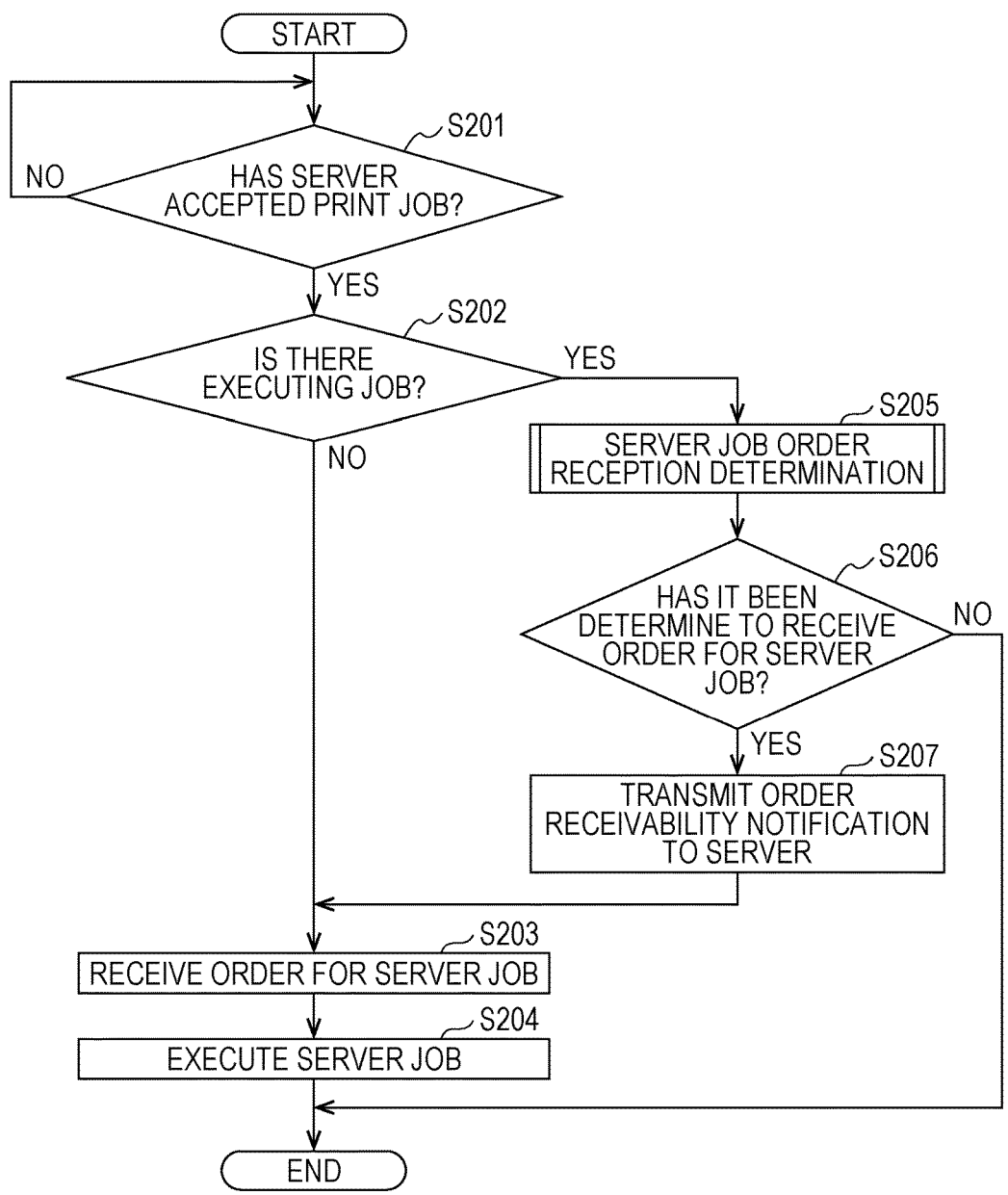
FIG. 7 is a flowchart showing a procedure of processing executed in the image forming apparatus.

FIG. 7 is a flowchart showing a procedure of processing executed in the image forming apparatus.

An algorithm shown in the flowchart of FIG. 7 is stored as a program in the storage 310 of the image forming apparatus 30, and is executed by the controller 305. The controller 305 reads the program and executes the processing, thereby controlling operation of each device of the image forming apparatus 30. Note that, although the image forming system 1 includes a plurality of image forming apparatuses 30, the processing of each image forming apparatus 30 is substantially the same.

As shown in FIG. 7, first, the controller 305 of the image forming apparatus 30 inquires of the central management server 20, thereby determining whether or not the central management server 20 has accepted the print job (step S201). The controller 305 inquires of the central management server 20 via the communicator 315 and the network 40, for example. Alternatively, the controller 305 may determine that the central management server 20 has accepted the print job by receiving a notification that the print job has been accepted, from the central management server 20.

In a case where the central management server 20 has not accepted the print job (step S201: NO), the controller 305 executes ordinary processing while continuing to monitor whether or not the central management server 20 has accepted the print job.

In a case where the central management server 20 has accepted the print job (step S201: YES), the controller 305 proceeds to the processing of step S202. Then, in response to confirmation of the idle state from the central management server 20, the controller 305 determines whether or not there is a print job being executed currently (hereinafter referred to as "job in execution") in the image forming apparatus 30 (step S202).

In a case where there is no job in execution (step S202: NO), that is, in a case where the image forming apparatus 30 is in the idle state, the controller 305 receives an order for a server job from the central management server 20 that has performed confirmation of the idle state (step S203). Then, the controller 305 executes the server job for which the order is received (step S204), and ends the processing.

In a case where there is an job in execution (step S202: YES), that is, in a case where the image forming apparatus 30 is not in the idle state, the controller 305 proceeds to server job order reception determination processing (step S205). The server job order reception determination processing is processing for determining whether or not to receive the order for the server job, and will be described in detail later with reference to FIG. 9.

Subsequently, in the processing of step S205, the controller 305 confirms whether or not it is determined to receive the order for the server job (step S206).

In a case where it is determined not to receive the order for the server job (step S206: NO), the controller 305 ends the processing.

In a case where it is determined to receive the order for the server job (step S206: YES), the controller 305 transmits an order receivability notification to the central management server 20 (step S207). Then, the controller 305 receives the order for the server job from the central management server 20 that has received the order receivability notification (step S203), and executes the server job for which the order is received, by 2-in-1 printing (step S204). Thereafter, the controller 305 ends the processing.

Figure 8:
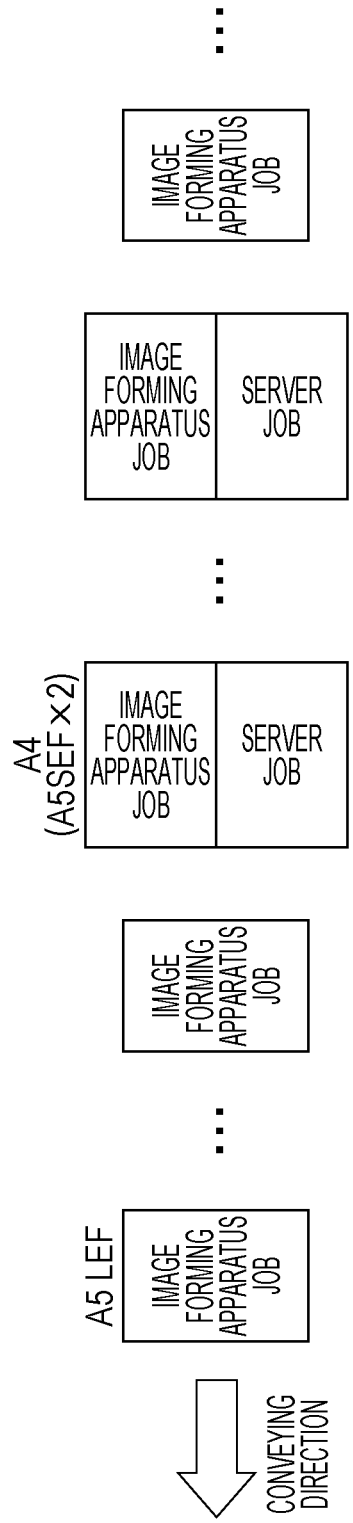
FIG. 8 is a diagram for explaining an example of how server jobs are executed by 2-in-1 printing.

FIG. 8 is a diagram for explaining an example of how the server jobs are executed by 2-in-1 printing.

As shown in FIG. 8, in a case where there is already an image forming apparatus job, the controller 305 needs to execute an additional server job without lowering the productivity of the image forming apparatus job. Therefore, as shown in FIG. 8, for example, the controller 305 controls the image former 345 to form a page image based on the image forming apparatus job and a page image based on the server job by allocating the page images in parallel. If the image former 345 can execute the image forming apparatus job and the server job by 2-in-1 printing, the productivity of the image forming apparatus job is not lowered.

After causing the image former 345 to form an image, the controller 305 controls the cutter 350 so that the sheet formed by allocating the page images of two pages in parallel is cut to be divided into two for each page image. If the cutter 350 cuts the sheet, for example, along the sheet conveying direction as the sheet is conveyed by the conveyor 340, the productivity of the image forming apparatus job is not lowered.

Next, details will be described of the server job order reception determination processing of step S205.

Figure 9:
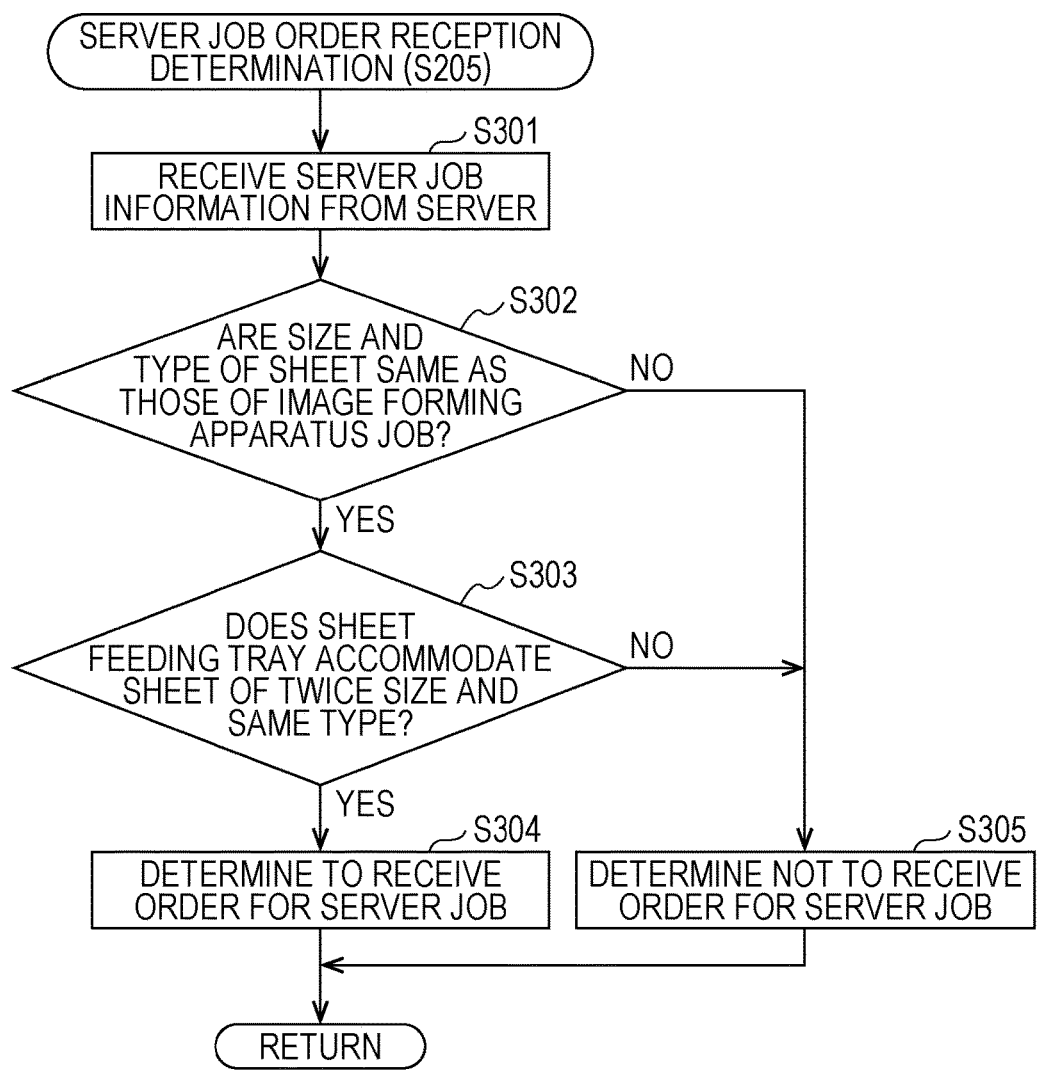
FIG. 9 is a subroutine flowchart showing a procedure of server job order reception determination processing.

FIG. 9 is a subroutine flowchart showing a procedure of the server job order reception determination processing.

As shown in FIG. 9, first, the controller 305 receives server job information from the central management server 20 (step S301). As described above, the server job information includes information such as the size and type of the sheet specified by the server job.

Subsequently, on the basis of the received information, the controller 305 determines whether or not the size and type of the sheet specified by the server job are the same as the size and type of the sheet specified by the image forming apparatus job (step S302). The image forming apparatus job includes not only a print job being executed currently (job in execution) in the image forming apparatus 30 but also a print job scheduled to be executed from now on (hereinafter referred to as "scheduled execution job"). That is, the controller 305 determines whether or not the size and type of the sheet specified by the server job are the same as the size and type of the sheet specified by the job in execution and/or the scheduled execution job.

As described above, if the image former 345 can execute the image forming apparatus job and the server job by 2-in-1 printing, the productivity of the image forming apparatus job is not lowered. However, in order for the image former 345 to execute 2-in-1 printing, it is necessary to combine print jobs that specify the sheet of the same size and the same type. Therefore, in the present embodiment, the controller 305 executes the processing of step S302. In the following, a fact that "the server job specifies the sheet of the same size and the same type as the sheet specified by the image forming apparatus job" is also referred to as a "first condition". In addition, in a case where at least one of the image forming apparatus job and the server job does not specify the type of the sheet, the controller 305 does not have to determine the type of the sheet.

In a case where the sizes and types of the sheets are not the same (step S302: NO), the controller 305 proceeds to the processing of step S305. The processing of step S305 will be described later.

In a case where the sizes and types of the sheets are the same (step S302: YES), the controller 305 determines whether or not the sheet feeding tray 336 accommodates a sheet of twice the size and the same type (step S303). That is, the controller 305 determines whether or not the sheet feeding tray 336 accommodates a sheet of twice the size of the sheet specified by both the image forming apparatus job and the server job and the same type as the sheet specified.

In order for the image former 345 to execute 2-in-1 printing, in addition to combining print jobs that specify the sheet of the same size and the same type, it is necessary that the sheet feeding tray 366 accommodates the sheet to be used for 2-in-1 printing. Therefore, in the present embodiment, the controller 305 executes the processing of step S303. In the following, a fact that "the sheet feeding tray 336 accommodates a sheet of twice the size of the sheet specified by both the image forming apparatus job and the server job and the same type as the sheet specified" is also referred to as a "second condition".

In a case where the sheet feeding tray 336 accommodates the sheet of twice the size and the same type (step S303: YES), the controller 305 determines to receive the order for the server job (step S304). Then, the controller 305 returns to the processing in FIG. 7.

In a case where the sheet feeding tray 336 does not accommodate the sheet of twice the size and the same type (step S303: NO), the controller 305 proceeds to the processing of step S305.

In a case where it is NO in step S302 or S303, the controller 305 determines not to receive the order for the server job (step S305). Then, the controller 305 returns to the processing in FIG. 7.

As described above, the image forming system 1 includes the central management server 20 enabled to accept a print job from the external client apparatus 10, and the image forming apparatus 30 enabled to receive an order for the print job from the central management server 20. In a case where a predetermined condition is satisfied for the print job accepted by the central management server 20 (server job), the image forming apparatus 30 determines to receive an order for the server job. In this case, the image forming apparatus 30 forms a page image based on the server job and a page image based on the print job being accepted by the image forming apparatus 30 (image forming apparatus job) by allocating the page images in parallel. Therefore, the image forming system 1 can execute an additional server job by 2-in-1 printing without lowering the productivity of the image forming apparatus job.

In addition, in the image forming system 1, the image forming apparatus 30 receives server job information from the central management server 20, and on the basis of the information, it is determined whether or not the first condition and the second condition are satisfied that are predetermined conditions. Therefore, the image forming apparatus 30 can determine whether or not to receive the order for the server job, considering a situation of the image forming apparatus job.

Note that, in the above embodiment, an example has been described of the procedure of the processing of the image forming system 1. However, the present embodiment is not limited thereto. Various modifications, improvements, and the like are possible as described below.

In the image forming system 1, it has been described that, in a case where the first condition in step S302 and the second condition in step S303 are satisfied, the image forming apparatus 30 executes the server job by 2-in-1 printing in step S204. However, the present embodiment is not limited thereto. Instead of step S303, it may be determined whether or not the sheet feeding tray 336 accommodates a sheet of the size of 2X (X is a natural number) times the size of the sheet specified by both the image forming apparatus job and the server job and the same type as the sheet specified. Then, in a case where the sheet feeding tray 336 accommodates the sheet described above, the image forming apparatus 30 may execute the server job by (2X)-in-1 printing in step S204.

In addition, it has been described that the image forming system 1 executes the server job order reception determination processing on the basis of the size and type of the sheet specified by the print job. However, the present embodiment is not limited thereto. In steps S302 and S303, the image forming system 1 may make a determination on the basis of only the size of the sheet without considering the type of the sheet. That is, the first condition may be that "the server job specifies a sheet of the same size as the sheet specified by the image forming apparatus job". In addition, the second condition may be that "the sheet feeding tray 336 accommodates a sheet of twice the size of the sheet specified". Then, the image forming apparatus 30 may form a page image based on the server job and a page image based on the image forming apparatus job by allocating the page images in parallel to the sheet of twice the size. As a result, the image forming system 1 can execute the server job more quickly without considering the type of the sheet.

In addition, it has been described that the image forming system 1 executes the server job by 2-in-1 printing, as shown in FIG. 8. However, the present embodiment is not limited thereto. In the following, various modifications of 2-in-1 printing will be described with reference to FIGS. 10 to 12. Note that, in FIGS. 10 to 12, orientations of character strings of "image forming apparatus job" and "server job" each correspond to an orientation of a sheet on which a page image is formed.

Figure 10:
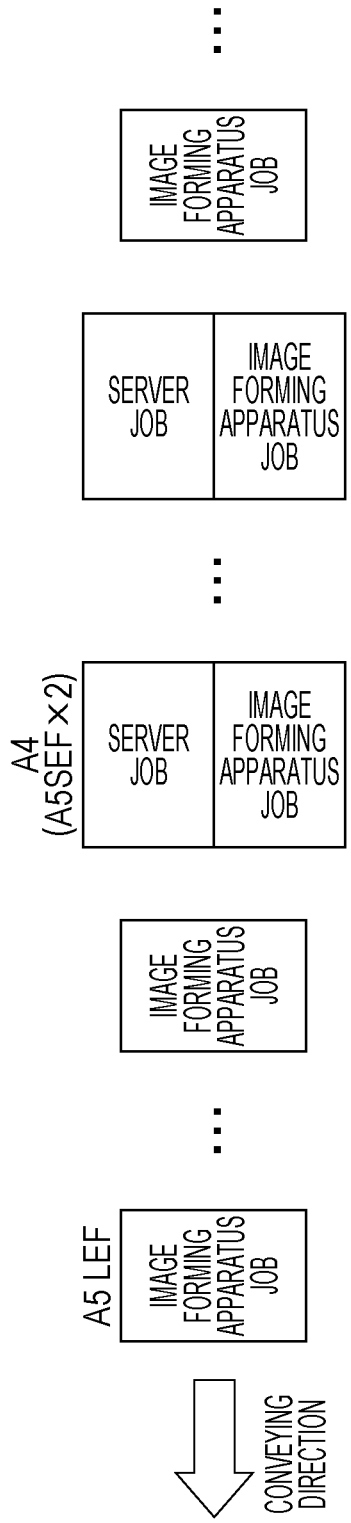
FIG. 10 is a diagram for explaining another example of how the server jobs are executed by 2-in-1 printing.
Figure 11:
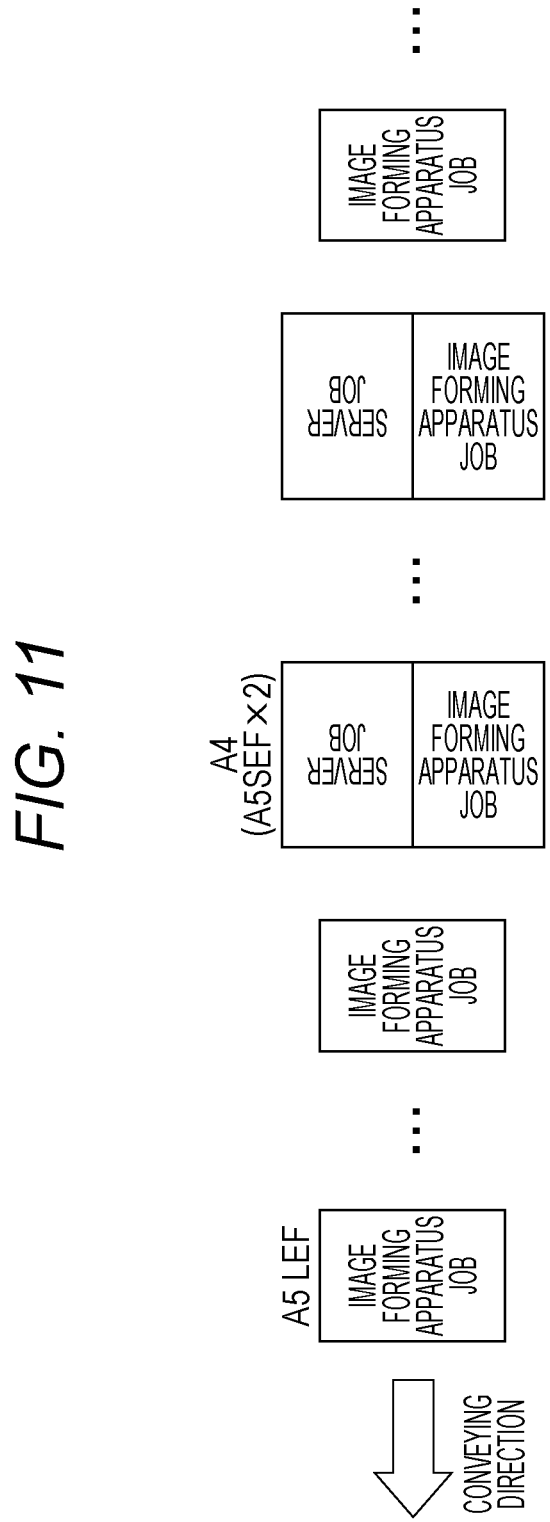
FIG. 11 is a diagram for explaining another example of how the server jobs are executed by 2-in-1 printing.

FIGS. 10 and 11 are diagrams for explaining other examples of how the server jobs are executed by 2-in-1 printing.

At least one of the image forming apparatus job and the server job may be set to be bound. In this case, the controller 305 of the image forming apparatus 30 may cause the image former 345 to form a page image based on the server job and a page image based on the image forming apparatus job by allocating the page images in parallel so that the side to be cut by the cutter 350 comes to the side to be bound at the time of bookbinding. Here, bookbinding includes, for example, case binding. As a result, the image forming system 1 can make the side to be cut inconspicuous at the time of bookbinding, thereby improving quality of bookbinding. Note that, the controller 305 may cause the image processor 330 to prepare image data whose orientation of the page image has been adjusted so that the side to be cut by the cutter 350 comes to the side to be bound at the time of bookbinding, and then cause the image former 345 to form an image based on the image data.

FIG. 10 shows an example in which "left binding" is set for bookbinding for the image forming apparatus job. The image former 345 forms the page images by allocating the page image based on the image forming apparatus job on the right side and the page image based on the sewer job on the left side so that the side to be cut by the cutter 350 comes to the left side in the page image based on the image forming apparatus job.

FIG. 11 shows an example in which "left binding" is set for bookbinding for both the image forming apparatus job and the server job. The image former 345 adjusts the arrangement of each page image so that the side to be cut by the cutter 350 comes to the left side, in each of the page image based on the image forming apparatus job and the page image based on the server job.

Note that, a method for allocating the page images in a case where bookbinding is set is not limited to the example shown in FIGS. 10 and 11.

In addition, the sheet on which each of the page images is formed may be ejected after being distinguished depending on the orientation of the sheet. As shown in FIGS. 10 and 11, at the time of ejection, orientations may be different between the sheet on which only the page image based on the image forming apparatus job is formed and the sheet on which the page images based on the image forming apparatus job and the server job are formed to be allocated in parallel. Therefore, the controller 305 may perform control so that, for example, the sheet on which the page image is formed is ejected after being distinguished into a corresponding one of different ejection trays depending on the orientation of the sheet. Alternatively, the controller 305 may perform control so that the sheet on which the page image is formed is ejected after being shifted to a corresponding one of different ejection positions on the same ejection tray depending on the orientation of the sheet. Since the image forming system 1 can distinguish and output sheets having different orientations, it is possible to reduce the time and labor for the user to align the orientations of the sheets.

Figure 12:
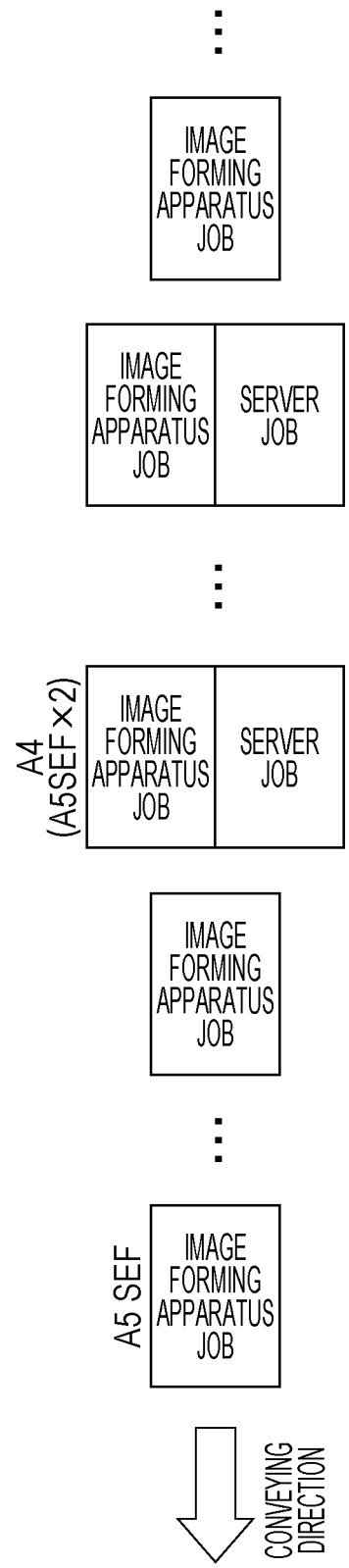
FIG. 12 is a diagram for explaining yet another example of how the server jobs are executed by 2-in-1 printing.

FIG. 12 is a diagram for explaining yet another example of how the server jobs are executed by 2-in-1 printing.

As shown in FIG. 12, regardless of whether or not the page image based on the image forming apparatus job is formed by being allocated in parallel with the page image based on the server job, the controller 305 may perform control so that the sheet is ejected in a constant orientation. That is, the controller 305 may cause the image former 345 to adjust the orientation of each page image in advance so that the sheet on which the page image based on the same print job is formed is always ejected in the same orientation.

Second Embodiment

Next, a second embodiment of the present invention will be described with reference to FIG. 13. In the first embodiment, it has been described that the image forming system 1 executes server job order reception determination processing on the basis of the size and type of the sheet specified by the print job. In the second embodiment, the image forming system 1 executes the server job order reception determination processing, further considering the delivery time of the server job, the schedule of the image forming apparatus job of each image forming apparatus 30, the presence or absence of replenishment of the sheet, and the like.

Figure 13:
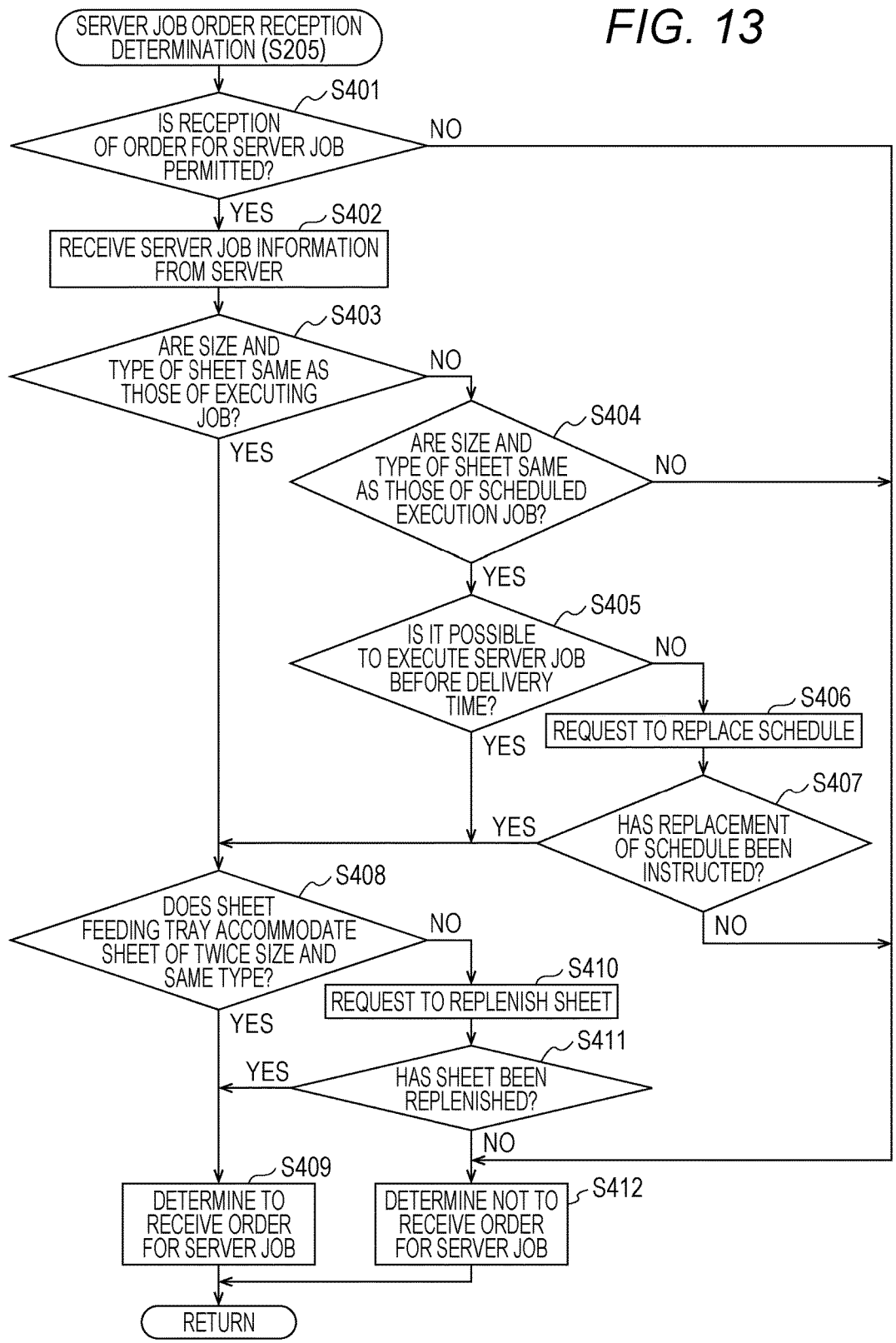
FIG. 13 is a subroutine flowchart showing a procedure of server job order reception determination processing according to a second embodiment.

FIG. 13 is a subroutine flowchart showing a procedure of the server job order reception determination processing according to the second embodiment. Since a configuration itself of the image forming system 1 according to the second embodiment is similar to that of the first embodiment, the description of the image forming system 1 will not be repeated. Also, in the second embodiment, since processing steps other than the server job order reception determination processing are similar to those in the first embodiment, the descriptions of the steps will not be repeated.

As shown in FIG. 13, first, the controller 305 determines whether or not order reception for a server job is permitted (step S401). The controller 305 determines whether or not the order reception for the server job is permitted in a case where there is a job in execution, that is, whether or not 2-in-1 printing is permitted in the image forming apparatus 30. Whether order reception is permitted or not may be selected in advance by the user via, for example, the operation panel 320 or a PC connected to the image forming apparatus 30. In addition, the order reception may be permitted as an initial setting.

In a case where the order reception is not permitted (step S401: NO), the controller 305 proceeds to the processing of step S412. The processing of step S412 will be described later.

In a case where the order reception is permitted (step S401: YES), the controller 305 receives server job information from the central management server 20 (step S402). The server job information includes information such as the size and type of the sheet specified by the server job, and the delivery time of the print job.

Subsequently, on the basis of the received information, the controller 305 determines whether or not the size and type of the sheet specified by the server job are the same as the size and type of the sheet specified by the job in execution (step S403). That is, the controller 305 determines whether or not the first condition is satisfied for the job in execution.

In a case where the size and type of the sheet are the same as those of the job in execution (step S403: YES), the controller 305 proceeds to the processing of step S408. The processing of step S408 will be described later.

In a case where the size and type of the sheet are not the same as those of the job in execution (step S403: NO), the controller 305 proceeds to the processing of step S404. Then, the controller 305 determines whether or not the size and type of the sheet specified by the server job are the same as the size and type of the sheet specified by a scheduled execution job (step S404). That is, the controller 305 determines whether or not the first condition is satisfied for the scheduled execution job.

In a case where the size and type of the sheet are not the same as those of the scheduled execution job (step S404: NO), the controller 305 proceeds to the processing of step S412. The processing of step S412 will be described later. This case corresponds to a case where the size and type of the sheet specified by the server job are different from the size and type of the sheet specified by all the image forming apparatus jobs.

In a case where the sheet size and type are the same as those of the scheduled execution job (step S404: YES), the controller 305 proceeds to the processing of step S405. This case corresponds to a case where the size and type of the sheet specified by the server job are different from the size and type of the sheet specified by the job in execution but are the same as the size and type of the sheet specified by at least one of the scheduled execution jobs.

Subsequently, the controller 305 confirms the delivery time specified by the server job, and determines whether or not the server job can be executed before the delivery time (step S405). In other words, the controller 305 determines whether or not the server job can be executed before the delivery time specified by the server job by 2-in-1 printing with the scheduled execution job that specifies a sheet of the same size and the same type as the sheet specified by the server job.

If the server job can be executed before the delivery time (step S405: YES), the controller 305 proceeds to the processing of step S408. The processing of step S408 will be described later.

If the server job cannot be executed before the delivery time (step S405: NO), the controller 305 notifies the user that replacement of a schedule of the image forming apparatus job is requested (step S406) so that the server job can be executed before the delivery time. For example, the controller 305 notifies the user by displaying on the operation panel 320 a message to the effect that the replacement of the schedule is requested. Alternatively, the controller 305 may notify the user by transmitting a message to the effect that the replacement of the schedule is requested, to the PC connected to the image forming apparatus 30, or the like, via the communicator 315 and the like. Note that, a method for requesting the replacement of the schedule is not limited to these methods. In addition, the controller 305 may request the replacement of the schedule by preparing a schedule replacement plan for executing the server job before the delivery time, presenting the schedule replacement plan to the user, and requesting the user to approve the schedule replacement plan.

Subsequently, the controller 305 determines whether or not the replacement of the schedule is instructed so that the server job is executed before the delivery time (step S407). The replacement of the schedule is instructed by the user via, for example, the operation panel 320, the PC connected to the image forming apparatus 30, or the like. Alternatively, the replacement of the schedule may be instructed by that the user approves the replacement of the schedule based on the schedule replacement plan.

In a case where the replacement of the schedule is not instructed (step S407: NO), the controller 305 proceeds to the processing of step S412. The processing of step S412 will be described later.

In a case where the replacement of the schedule is instructed (step S407: YES), the controller 305 proceeds to the processing of step S408.

In a case where it is YES in step S403, S405 or S407, the controller 305 determines whether or not the sheet feeding tray 336 accommodates a sheet of twice the size of the sheet specified by both the image forming apparatus job and the server job and the same type as the sheet specified (step S408). That is, the controller 305 determines whether or not the second condition is satisfied.

In a case where the sheet feeding tray 336 accommodates the sheet of twice the size and the same type (step S408: YES), the controller 305 determines to receive the order for the server job (step S409). Then, the controller 305 returns to the processing in FIG. 7.

In a case where the sheet feeding tray 336 does not accommodate the sheet of twice the size and the same type (step S408: NO), the controller 305 notifies the user that replenishment of the sheet to the sheet feeding tray 356 is requested (step S410). For example, the controller 305 notifies the user by causing the operation panel 320 to display a message to the effect that the replenishment of the sheet is requested, or transmitting the message to the effect that the replenishment of the sheet is requested to the PC connected to the image forming apparatus 30, or the like.

Subsequently, the controller 305 determines whether or not the sheet of twice the size and the same type has been replenished (step S411).

In a case where the sheet has been replenished (step S411: YES), the controller 305 determines to receive the order for the server job (step S409). Then, the controller 305 returns to the processing in FIG. 7.

In a case where the sheet has not been replenished (step S411: NO), the controller 305 proceeds to the processing of step S412.

In a case where it is NO in steps S401, S404, S407, or S411, the controller 305 determines not to receive the order for the server job (step S412). Then, the controller 305 returns to the processing in FIG. 7.

As described above, in a case where the order reception for the server job in a case where there is an job in execution is not permitted in the image forming apparatus 30, the image forming system 1 according to the second embodiment determines not to receive the order for the server job regardless of whether or not the first condition and the second condition are satisfied. As a result, in a case where it is not desired to execute the image forming apparatus job by 2-in-1 printing or in a case where it is not desired to use a high-grade sheet or a large size sheet for 2-in-1 printing, the user of the image forming system 1 can prohibit 2-in-1 printing in advance.

In addition, even in a case where the first condition is satisfied for the scheduled execution job, in a case where the server job cannot be executed before the delivery time specified by the server job, the image forming system 1 notifies the user that the replacement of the schedule of the image forming apparatus job is requested. In a case where the replacement of the schedule is instructed, the image forming system 1 can receive the order for the server job, so that it is possible to improve frequency of receiving the order for the server job.

In addition, in a case where the second condition is not satisfied, the image forming system 1 notifies the user that the replenishment of the sheet to the sheet feeding tray 336 is requested. In a case where the sheet is replenished, the image forming system 1 can receive the order for the server job, so that it is possible to improve the frequency of receiving the order for the server job.

Note that, it has been described that the image forming system 1 executes the server job order reception determination processing on the basis of the size and type of the sheet specified by the print job. However, the present embodiment is not limited thereto. Similarly to the first embodiment, the image forming system 1 may make determinations on the basis of only the size of the sheet without considering the type of the sheet in steps S403, S404, and S408. As a result, the image forming system 1 can execute the server job more quickly without considering the type of the sheet.

In addition, it has been described that, in the image forming system 1, the controller 305 requests the user to replace the schedule of the print job being accepted (or to approve the replacement of the schedule based on the schedule replacement plan) in step S406. However, the present embodiment is not limited thereto. In a case where the schedule can be replaced so that all of the image forming apparatus job and the server job are executed before the delivery time, the controller 305 may omit the processing of step S406 and automatically replace the schedule. In addition, the controller 305 may allow the user in advance to set whether or not to permit automatic replacement of the schedule via the operation panel 320, the PC connected to the image forming apparatus 30, or the like. Further, the controller 305 may set whether or not to permit automatic replacement of the schedule depending on a time zone in which the image forming apparatus 30 operates. As a result, even in a case where the image forming apparatus 30 operates at night or the like in which user's instruction and the like cannot be confirmed immediately, the image forming system 1 can execute the server job order reception determination processing without delay.

In addition, the controller 305 may limit the time for determining whether or not the replacement of the schedule is instructed in step S407. The controller 305 starts time measurement from the time when the user is requested to replace the schedule in step S406. Then, in step S407, in a case where a predetermined time-out period has elapsed without receiving the instruction of replacement of the schedule, the controller 305 may automatically proceed to the processing of step S412. The predetermined time-out period may be set by the user, or may be stored as an initial value in the storage 310 or the like of the image forming apparatus 30. Similarly, in step S411, the controller 305 may limit the time for determining whether or not the sheet has been replenished. As a result, the image forming system 1 can execute the server job order reception determination processing without delay.

In addition, it has been described that, in step S408, the controller 305 determines whether or not the sheet feeding tray 336 accommodates the sheet of twice the size and the same type. However, the present embodiment is not limited thereto. When the order for the server job is received, the sheet accommodated in the sheet feeding tray 336 for the image forming apparatus job is used for the server job, and there is a possibility that the sheet becomes insufficient when the image forming apparatus job is executed. Therefore, the controller 305 may further determine whether or not the sheet to be used for the image forming apparatus job becomes insufficient as a result of receiving the order for the server job together with the determination in step S408.

Then, in a case where the sheet to be used for the image forming apparatus job becomes insufficient as a result of receiving the order for the server job, the controller 305 may notify the user that the sheet becomes insufficient before receiving the order for the server job. For example, the controller 305 notifies the user by causing the operation panel 320 to display a message to the effect that the sheet becomes insufficient, or by sending the message to the effect that the sheet becomes insufficient to the PC connected to the image forming apparatus 30, or the like. In addition, similarly to step S410, the controller 305 may notify the user that replenishment of the sheet becoming insufficient to the sheet feeding tray 356 is requested. Then, in step S411, the controller 305 may determine whether or not the insufficient sheet has been replenished. As a result, the image forming apparatus 30 can determine whether or not to receive the order for the server job without lowering the productivity of the image forming apparatus job.

In addition, it has been described that, in the first embodiment and the second embodiment, the image forming apparatus 30 executes the server job order reception determination processing on the basis of various conditions. However, the image forming apparatus 30 may further consider another condition. In the following, various modifications are shown in the server job order reception determination processing.

FIGS. 14 to 17, 18A, and 18B are diagrams for explaining various modifications in the server job order reception determination processing.

Figure 14:
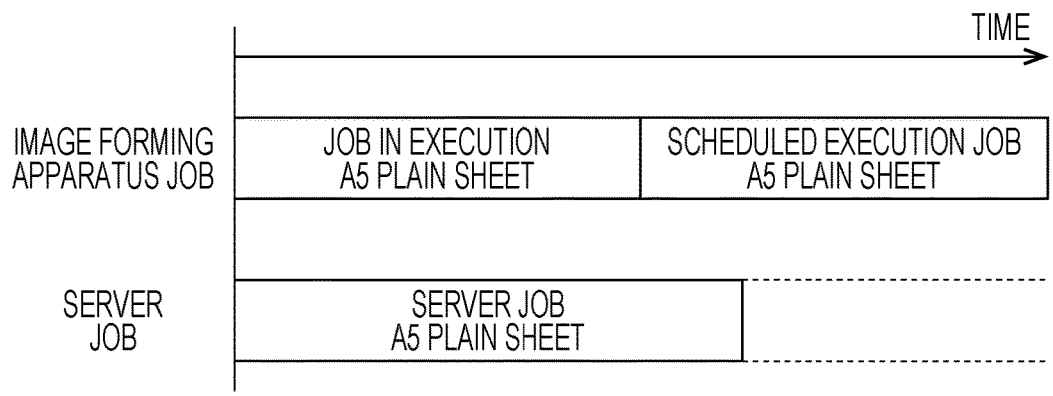
FIG. 14 is a diagram for explaining various modifications in the server job order reception determination processing.

FIG. 14 shows an example in a case where the number of pages of the server job is greater than the number of remaining pages of the job in execution at the time of receiving the order for the server job. Here, the "remaining page" means a page on which no image is formed in the print job. In this case, while the first condition is satisfied for the job in execution among the image forming apparatus jobs, the job in execution ends before the server job. For this reason, the controller 305 also confirms whether or not the first condition is satisfied for the scheduled execution job subsequent to the job in execution. In the example shown in FIG. 14, since the first condition is satisfied also for the subsequent scheduled execution job, the controller 305 determines to receive the order for the server job. The controller 305 controls the image former 345 to form a page image based on the server job and a page image based on the subsequent scheduled execution job by allocating the page images in parallel, after ending the job in execution. In this case, the image former 345 forms a page image not formed to be allocated in parallel with a page image based on the job in execution among page images based on the server job, by allocating the page image in parallel with the page image based on the subsequent scheduled execution job. As a result, the image forming system 1 can appropriately determine whether or not to receive the order for the server job even in a case where the number of remaining pages of the job in execution is smaller than the number of pages of the server job.

Figure 15:
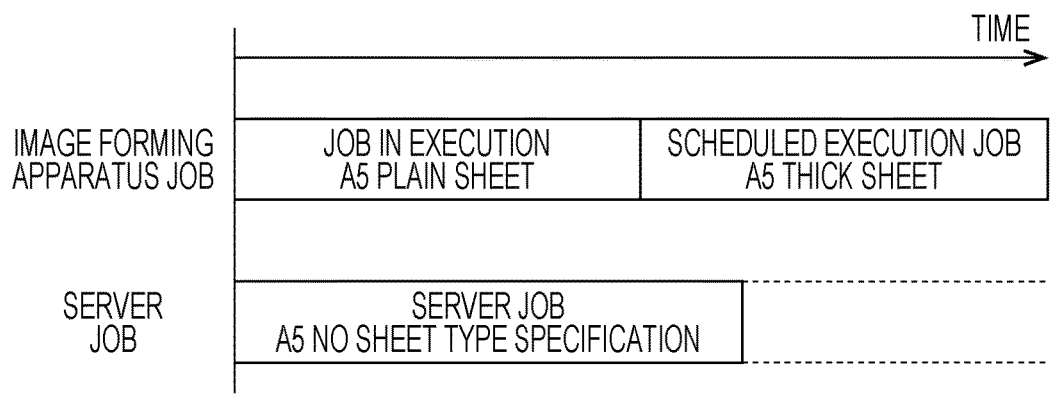
FIG. 15 is a diagram for explaining various modifications in the server job order reception determination processing.

FIG. 15 shows an example in a case where the number of pages of the server job is greater than the number of remaining pages of the job in execution and the server job does not specify the type of the sheet at the time of receiving the order for the server job. In this case, whether or not the first condition is satisfied is determined on the basis of only the size of the sheet. In the example shown in FIG. 15, since the first condition is satisfied for both the job in execution and the scheduled execution job, the controller 305 determines to receive the order for the server job. However, the type of the sheet used for 2-in-1 printing is changed from a plain sheet to a thick sheet in the middle of 2-in-1 printing. As a result, the image forming system 1 can also consider a case where the server job does not specify the type of the sheet in a case where the number of remaining pages of the job in execution is smaller than the number of pages of the server job.

Figure 16:
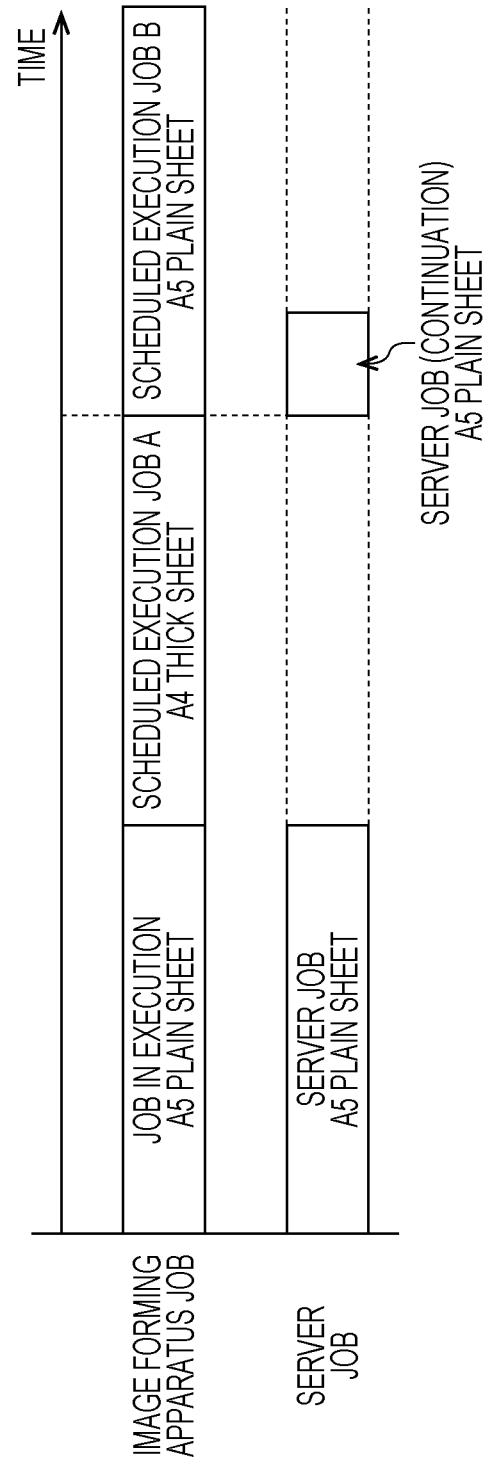
FIG. 16 is a diagram for explaining various modifications in the server job order reception determination processing.

FIG. 16 shows an example in a case where the number of pages of the server job is greater than the number of remaining pages of the job in execution and the first condition is not satisfied for the subsequent scheduled execution job at the time of receiving the order for the server job. In this case, the controller 305 cannot execute the server job by 2-in-1 printing with the scheduled execution job A subsequent to the job in execution. However, in the example shown in FIG. 16, the first condition is satisfied for another scheduled execution job B other than the scheduled execution job A. Therefore, the controller 305 may determine to receive the order for the server job, and control the image former 345 to form a page image based on the server job and a page image based on the scheduled execution job B by allocating the page images in parallel, after ending the scheduled execution job A. In this case, the image former 345 forms a page image not formed to be allocated in parallel with a page image based on the job in execution among page images based on the server job, by allocating the page image in parallel with the page image based on the scheduled execution job B. As a result, the image forming system 1 can divide and execute the server job depending on the situation. However, in a case where the server job cannot be completed before the delivery time specified by the server job when the server job is executed by 2-in-1 printing with the scheduled execution job B, the controller 305 may determine not to receive the order for the server job.

Figure 17:
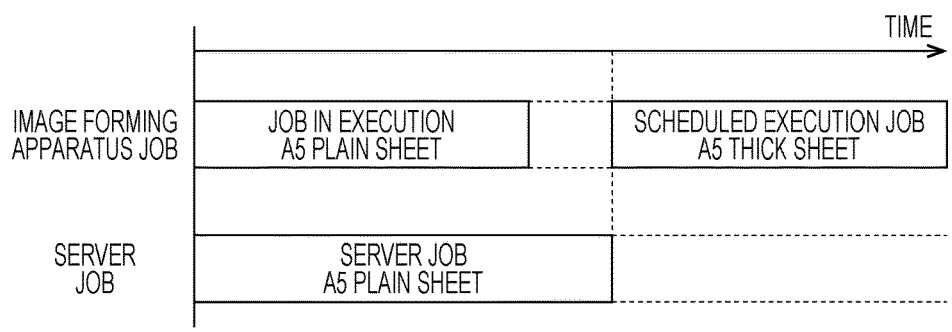
FIG. 17 is a diagram for explaining various modifications in the server job order reception determination processing.

FIG. 17 shows another example in a case where the number of pages of the server job is greater than the number of remaining pages of the job in execution at the time of receiving the order for the server job. In this case, the controller 305 may control the image former 345 to preferentially form a page image not formed to be allocated in parallel with a page image based on the job in execution among page images based on the server job, after determining to receive the order for the server job. However, in a case where the delivery time specified by the scheduled execution job is not satisfied when the server job is preferentially executed with respect to the scheduled execution job, the controller 305 may determine not to receive the order for the server job.

In addition, in a case where the server job is preferentially executed with respect to the scheduled execution job, the controller 305 may limit the number of pages of the server job permitted to be preferentially executed. For example, in a case where the number of remaining pages of the server job is less than or equal to a predetermined number of pages at the time of ending the job in execution, the controller 305 may execute the server job in preference to the scheduled execution job. The predetermined number of pages may be set by the user, or may be stored as an initial value in the storage 310 or the like of the image forming apparatus 30. As a result, the image forming system 1 can quickly complete the server job, for example, in a case where the number of remaining pages of the server job is small.

FIGS. 18A and 18B are diagrams for explaining how the server jobs are preferentially executed with respect to the scheduled execution job.

In a case where the server job is preferentially executed with respect to the scheduled execution job, as shown in FIG. 18A, the controller 305 may cause the image former 345 to form a page image, on which no image is formed, of the server job, by allocating page images for two pages at a time (execute 2-in-1 printing). Alternatively, as shown in FIG. 18B, the controller 305 may cause the image former 345 to form a page image, on which no image is formed, of the server job, one page at a time on a sheet originally used by the job in execution (execute ordinary 1-in-1 printing). As a result, for example, the user of the image forming system 1 can select 2-in-1 printing in a case where it is desired to complete the server job as soon as possible, and can select 1-in-1 printing in a case where it is not desired to use a high-grade sheet or a large size sheet for 2-in-1 printing.

Third Embodiment

Next, a third embodiment of the present invention will be described with reference to FIGS. 19 to 21. In the first and second embodiments, it has been described that the image forming apparatus 30 executes the server job order reception determination processing. In the third embodiment, the image forming apparatus 30 does not make a determination, but the central management server 20 determines whether or not to place an order for a server job to the image forming apparatus 30.

<Processing of Image Forming System 1>

Figure 19:
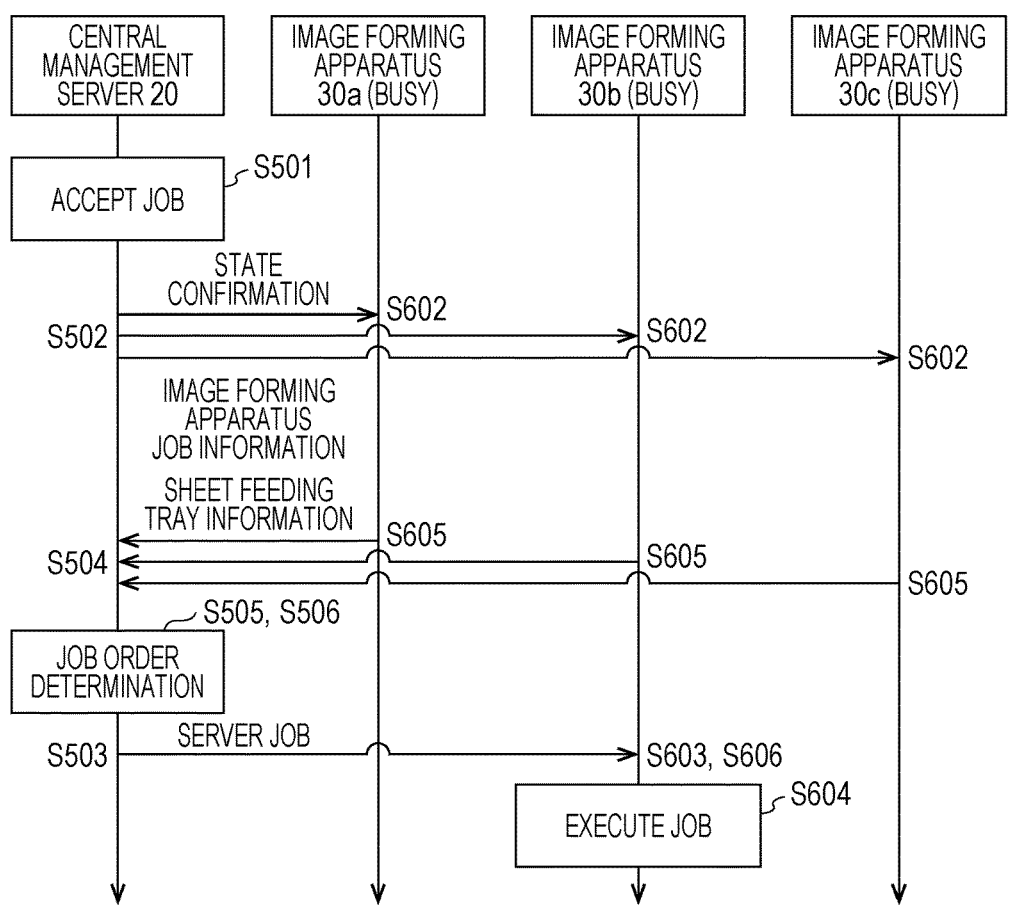
FIG. 19 is a diagram showing a relationship of processing between a central management server and image forming apparatuses according to a third embodiment.

FIG. 19 is a diagram showing a relationship of processing between the central management server and the image forming apparatuses according to the third embodiment. Note that, since a configuration itself of the image forming system 1 according to the third embodiment is similar to that of the first embodiment, the description of the configuration will not be repeated.

As shown in FIG. 19, the central management server 20 and the image forming apparatuses 30a to 30c perform processing while communicating with each other as time passes. The processing indicated by each step number such as "S501" in FIG. 19 corresponds to the processing indicated by the step number in FIGS. 20 and 21 described later. In addition, in FIG. 19, the client apparatus 10 is not illustrated. Further, a flow of the processing, in a case where there is an image forming apparatus 30 in the idle state when the central management server 20 according to the third embodiment accepts a print job from the client apparatus 10, is similar to that in FIG. 5A of the first embodiment. Thus, the description of the flow will not be repeated.

FIG. 19 shows a flow of the processing in a case where there is no image forming apparatus 30 in the idle state under the management of the central management server 20 when the central management server 20 accepts a print job from the client apparatus 10. First, when accepting the print job from the client apparatus 10, the central management server 20 confirms whether or not the image forming apparatuses 30a to 30c are in the idle state. In the example shown in FIG. 19, since there is no image forming apparatus 30 in the idle state, the central management server 20 does not present the server job at this time. The central management server 20 receives image forming apparatus job information of the image forming apparatuses 30a to 30c and information on the sheet accommodated in the sheet feeding tray 336 of the image forming apparatuses 30a to 30c from each of the image forming apparatuses 30a to 30c. The image forming apparatus job information includes information such as the size and type of the sheet specified by the image forming apparatus job. In the following, the information on the sheet accommodated in the sheet feeding tray 336 is referred to as "sheet feeding tray information".

On the basis of the received information, the central management server 20 determines whether or not to place the order for the server job to the image forming apparatuses 30a to 30c. In the example shown in FIG. 19, the central management server 20 determines to place the order for the server job to the image forming apparatus 30b and presents the server job. Then, the image forming apparatus 30b receives and executes the order for the server job.

In the following, details will be described of the processing of the central management server 20 and the image forming apparatus 30.

<Processing of Central Management Server 20>

Figure 20:
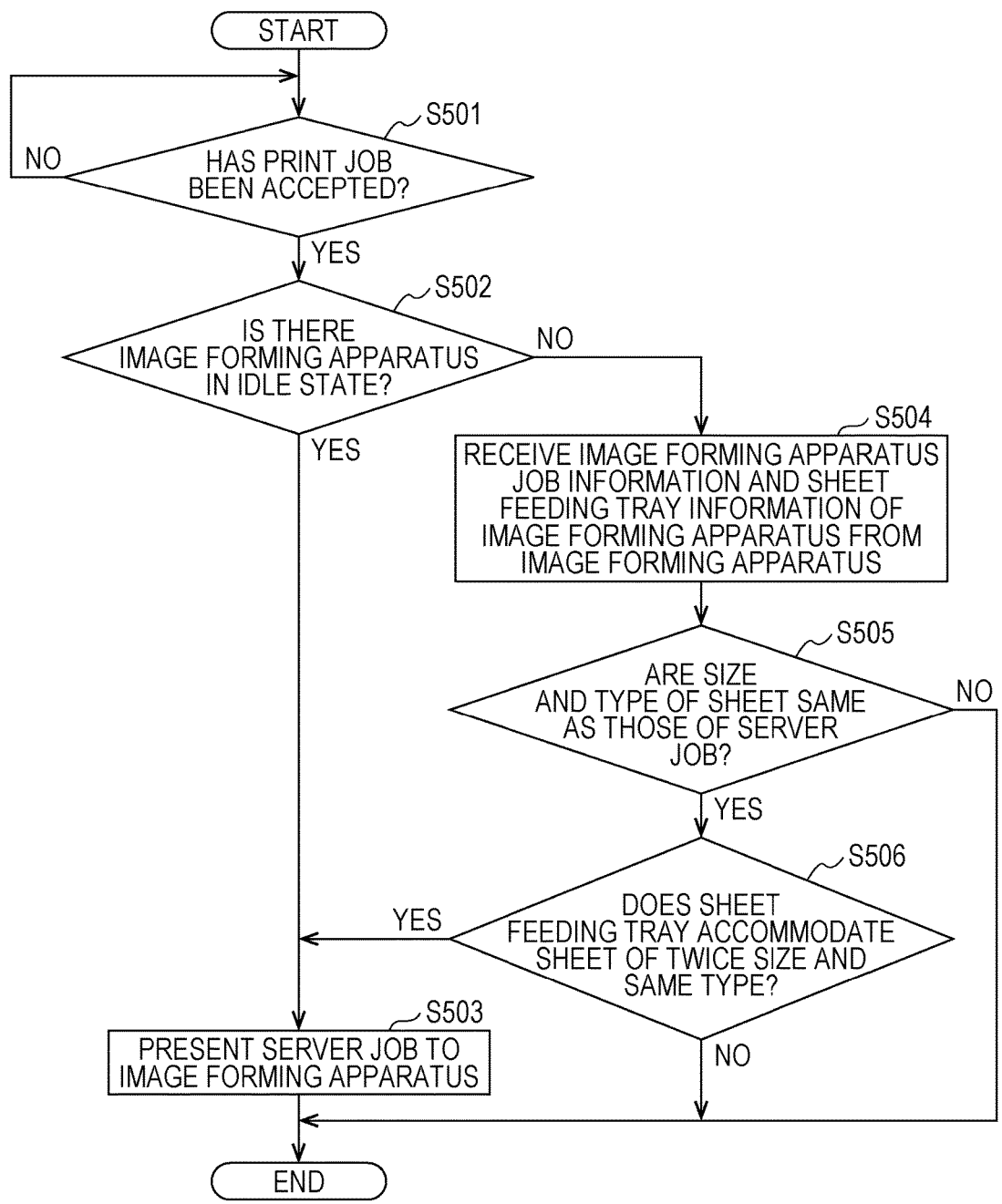
FIG. 20 is a flowchart showing a procedure of processing executed in the central management server according to the third embodiment.

FIG. 20 is a flowchart showing a procedure of processing executed in the central management server according to the third embodiment.

An algorithm shown in the flowchart of FIG. 20 is stored as a program in the storage 22 of the central management server 20 and is executed by the controller 21. The controller 21 reads the program and executes the processing, thereby controlling operation of each device of the central management server 20. Note that, since the processing in steps S501 to S503 in FIG. 20 is similar to the processing in steps S101 to S103 in FIG. 6, the description of the processing will not be repeated.

As shown in FIG. 20, in a case where there is no image forming apparatus 30 in the idle state in step S502 (step S502: NO), image forming apparatus job information and sheet feeding tray information are received from each image forming apparatus 30 (step S504).

Subsequently, on the basis of the received image forming apparatus job information, the controller 21 determines whether or not the size and type of the sheet specified by the server job are the same as the size and type of the sheet specified by the image forming apparatus job of the image forming apparatus 30 (step S505). That is, the controller 21 determines whether or not the first condition is satisfied.

In a case where the size and type of the sheet are the same (step S505: YES), the controller 21 proceeds to the processing of step S506. Then, on the basis of the sheet feeding tray information, the controller 21 determines whether or not the sheet feeding tray 336 of the image forming apparatus 30 accommodates a sheet of twice the size and the same type (step S506). That is, the controller 21 determines whether or not the second condition is satisfied.

In a case where the sheet feeding tray 336 accommodates the sheet of twice the size and the same type (step S506: YES), the controller 21 determines to place the order for the server job to the image forming apparatus 30, and presents the server job to the image forming apparatus 30 (step S503). That is, by presenting the server job, the controller 21 causes the image forming apparatus 30 to form a page image based on the server job and a page image based on the image forming apparatus job by allocating the page images in parallel.

In a case where it is NO in step S505 or S506, the controller 21 does not present the server job to the image forming apparatus 30 and ends the processing.

<Processing of Image Forming Apparatus 30>

Figure 21:
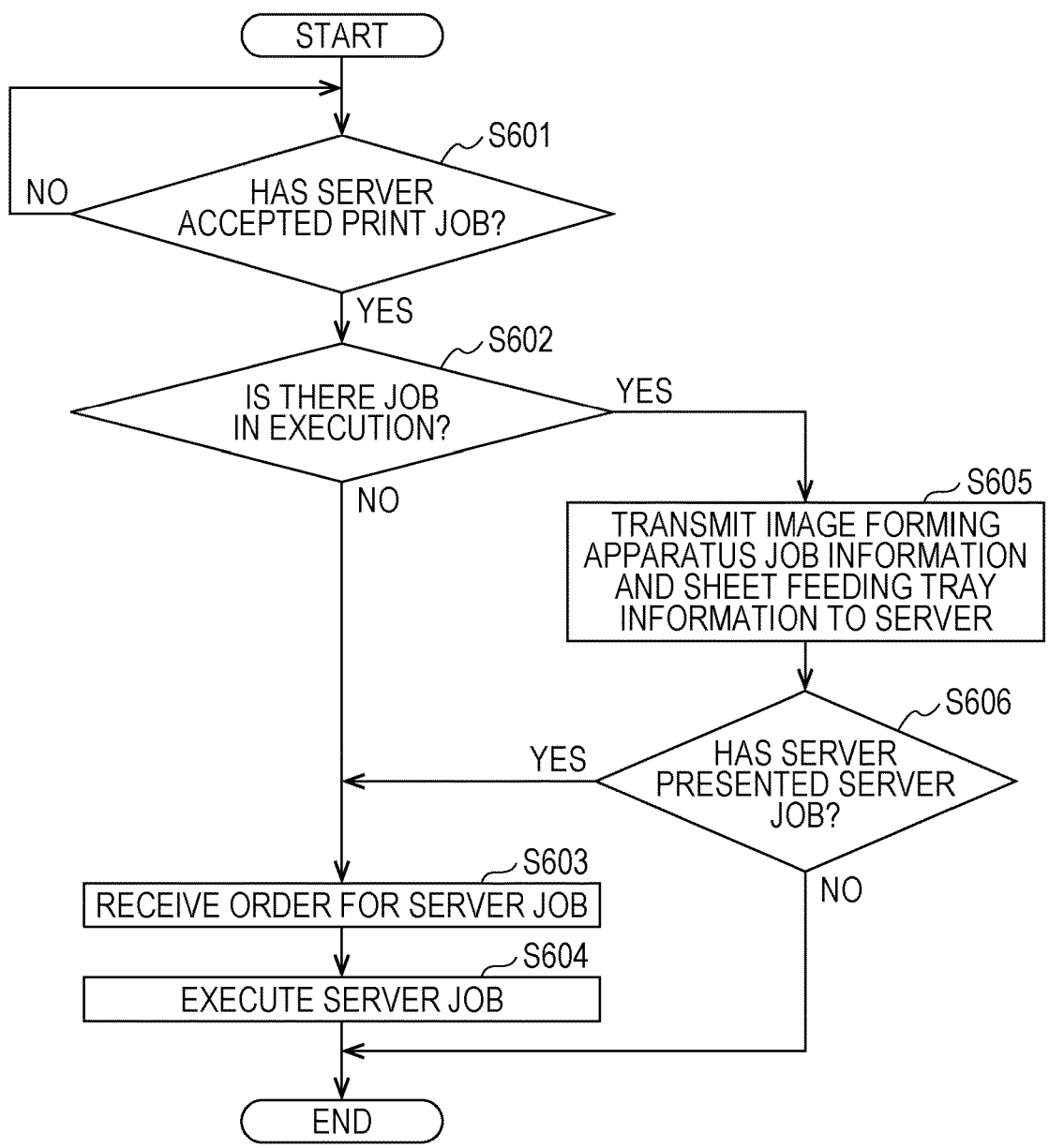
FIG. 21 is a flowchart showing a procedure of processing executed in the image forming apparatus according to the third embodiment.

FIG. 21 is a flowchart showing a procedure of processing executed in the image forming apparatus according to the third embodiment.

An algorithm shown in the flowchart of FIG. 21 is stored as a program in the storage 310 of the image forming apparatus 30 and is executed by the controller 305. The controller 305 reads the program and executes the processing, thereby controlling operation of each device of the image forming apparatus 30. Note that, although the image forming system 1 includes a plurality of image forming apparatuses 30, the processing of each image forming apparatus 30 is substantially the same. In addition, since the processing in steps S601 to S604 in FIG. 21 is similar to the processing in steps S201 to S204 in FIG. 7, the description of the processing will not be repeated.

As shown in FIG. 21, in a case where there is a job in execution in step S602 (step S602: YES), the controller 305 proceeds to the processing of step S605. Then, the controller 305 transmits the image forming apparatus job information and the sheet feeding tray information to the central management server 20 (step S605).

Subsequently, the controller 305 determines whether or not the central management server 20 has presented a server job (step S606).

In a case where the central management server 20 has not presented the server job (step S606: NO), the controller 305 ends the processing.

In a case where the central management server 20 has presented the server job (step S606: YES), the controller 305 determines to receive the order for the server job from the central management server 20 (step S603). Then, the controller 305 executes the server job for which the order is received, by 2-in-1 printing (step S604) and ends the processing.

As described above, in the image forming system 1 according to the third embodiment, the central management server 20 receives the information on the print job being accepted by the image forming apparatus 30 and the information on the sheet accommodated in the sheet feeding tray 336, from the image forming apparatus 30. Then, on the basis of the information, the central management server 20 determines whether or not to place an order for a print job to the image forming apparatus 30. Therefore, even in a case where each image forming apparatus 30 cannot execute the server job order reception determination processing, the central management server 20 can determine whether or not to place the order for the server job to the image forming apparatus 30.

Note that, it has been described that the central management server 20 determines whether or not the first condition and the second condition are satisfied on the basis of the size and type of the sheet specified by the print job. However, the present embodiment is not limited thereto. In steps S505 and S506, the central management server 20 may make a determination on the basis of only the size of the sheet without considering the type of the sheet. As a result, the image forming system 1 can more quickly determine whether or not to place the order for the print job to the image forming apparatus 30 without considering the type of the sheet.

In addition, the central management server 20 may execute complicated determination processing similarly to the server job order reception determination processing of the second embodiment. In other words, the central management server 20 may determine whether or not to place the order for the print job to the image forming apparatus 30, further considering the delivery time of the server job, the schedule of the image forming apparatus job of each image forming apparatus 30, the presence or absence of replenishment of the sheet, and the like.

In the above embodiment, the client apparatus 10, the central management server 20, and the image forming apparatus 30 each have been described as one apparatus. However, the present embodiment is not limited thereto. For example, for the image forming apparatus 30, an information processing apparatus that executes various types of determination processing and an apparatus that executes image forming processing may be separately configured. In this case, the information processing apparatus and the apparatus that executes the image forming processing are connected together via a bus.

In addition, the processing in the image forming system 1 may include steps other than those in the above flowchart or does not have to include some of the above steps. In addition, the execution order of the steps is not limited to that in the above embodiment. Further, each step may be combined with another step to be executed as one step, may be included in another step to be executed, or may be divided into a plurality of steps to be executed.

In addition, the device and method for performing various types of processing in the image forming system 1 can be implemented by either a dedicated hardware circuit or a programmed computer. The program may be provided by a computer-readable recording medium such as a USB memory, a flexible disk, a compact disc read only memory (CD-ROM), or the like, or may be provided online via a network such as the Internet. In this case, the program recorded in the computer-readable recording medium is usually transferred to and stored in a storage such as a hard disk. In addition, the above program may be provided as standalone application software or may be incorporated into software of each apparatus as one function of the image forming system 1.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising: a server enabled to accept a print job from a client apparatus; and an image forming apparatus enabled to receive an order for the print job from the server, wherein
the image forming apparatus includes:
a sheet feeding tray that accommodates a sheet;
a hardware processor that determines to receive an order for a print job accepted by the server in a case where a first condition and a second condition are both satisfied, the first condition being that a print job accepted by the server specifies a sheet of a same size as a size of a sheet specified by a print job being accepted by the image forming apparatus and at least either being executed or scheduled to be executed, the second condition being that the sheet feeding tray accommodates a sheet of twice the size of the sheet specified; and
an image former that forms a page image based on the print job accepted by the server and a page image based on the print job being accepted specifying the sheet of the same size as the size of the sheet specified, by allocating the page images in parallel to the sheet of twice the size of the sheet specified, in a case where it is determined by the hardware processor that the order for the print job accepted by the server is to be received.

2. The image forming system according to claim 1, wherein
the first condition is that the print job accepted by the server specifies a sheet of the same size and a same type as the size and a type of the sheet specified by the print job being accepted and at least either being executed or scheduled to be executed,
the second condition is that the sheet feeding tray accommodates a sheet of twice the size of the sheet specified and of the same type as the type of the sheet specified, and
the image former forms the page image based on the print job accepted by the server and a page image based on the print job being accepted specifying the sheet of the same size and the same type as the size and the type of the sheet specified, by allocating the page images in parallel to the sheet of twice the size of the sheet specified and of the same type as the type of the sheet specified, in the case where it is determined by the hardware processor that the order for the print job accepted by the server is to be received.

3. The image forming system according to claim 1, wherein
the hardware processor receives, from the server, information on the print job accepted by the server, and determines whether or not the first condition and the second condition are satisfied, based on the information.

4. The image forming system according to claim 1, wherein
the server receives information on the print job being accepted by the image forming apparatus and information on the sheet accommodated in the sheet feeding tray from the image forming apparatus, and determines whether or not the first condition and the second condition are satisfied, based on the information.

5. The image forming system according to claim 1, wherein
in a case where reception of an order for the print job accepted by the server in a presence of the print job being executed is not permitted in the image forming apparatus, the hardware processor determines not to receive the order for the print job accepted by the server regardless of whether or not the first condition and the second condition are satisfied.

6. The image forming system according to claim 1, wherein
even in a case where the first condition is satisfied for the print job scheduled to be executed, in a case where the print job accepted by the server cannot be executed before a delivery time specified by the print job accepted by the server, the hardware processor notifies a user that replacement of a schedule of the print job being accepted is requested.

7. The image forming system according to claim 1, wherein
in a case where the second condition is not satisfied, the hardware processor notifies a user that replenishment of the sheet not accommodated to the sheet feeding tray is requested.

8. The image forming system according to claim 1, wherein
in a case where a sheet to be used for the print job being accepted becomes insufficient as a result of receiving the order for the print job accepted by the server, the hardware processor notifies a user that the sheet to be used for the print job being accepted becomes insufficient, before receiving the order for the print job accepted by the server.

9. The image forming system according to claim 1, wherein
in a case where, among the print jobs being accepted, the first condition is satisfied for the print job being executed, the number of pages of the print job accepted by the server is greater than the number of remaining pages, on which no image is formed, of the print job being executed, and the first condition is satisfied also for the print job scheduled to be executed subsequent to the print job being executed, the image former forms a page image not formed to be allocated in parallel with a page image based on the print job being executed, among page images based on the print job accepted by the server, by allocating the page image in parallel with a page image based on the subsequent print job scheduled to be executed.

10. The image forming system according to claim 9, wherein
in a case where the print job accepted by the server does not specify a type of a sheet, whether or not the first condition is satisfied is determined based solely on a size of the sheet.

11. The image forming system according to claim 1, wherein
even in a case where, among the print jobs being accepted, the first condition is satisfied for the print job being executed, the number of pages of the print job accepted by the server is greater than the number of remaining pages on which no image is formed of the print job being executed, and the first condition is not satisfied for the print job scheduled to be executed subsequent to the print job being executed, in a case where the first condition is satisfied for another of the print job scheduled to be executed other than the subsequent print job scheduled to be executed, the image former forms a page image not formed to be allocated in parallel with a page image based on the print job being executed, among page images based on the print job accepted by the server, by allocating the page image in parallel with a page image based on the other of the print job scheduled to be executed.

12. The image forming system according to claim 1, wherein
in a case where the first condition is satisfied for the print job being executed, among the print jobs being accepted, and the number of pages of the print job accepted by the server is greater than the number of remaining pages, on which no image is formed, of the print job being executed, and in a case where the number of remaining pages, on which no image is formed, of the print job accepted by the server is less than or equal to a predetermined number of pages at time of ending the print job being executed, the image former preferentially forms a page image not formed to be allocated in parallel with a page image based on the print job being executed among page images based on the print job accepted by the server.

13. The image forming system according to claim 12, wherein
the image former forms a page image not formed to be allocated in parallel with a page image based on the print job being executed among page images based on the print job accepted by the server, by allocating the page images in parallel for two pages at a time.

14. The image forming system according to claim 12, wherein
the image former forms a page image not formed to be allocated in parallel with a page image based on the print job being executed among page images based on the print job accepted by the server, one page at a time.

15. The image forming system according to claim 1, wherein
the image forming apparatus further includes a cutter that cuts a sheet for each page image, the sheet being formed by allocating, in parallel, a page image based on the print job being accepted and a page image based on the print job accepted by the server,
in a case where at least one of the print job being accepted and the print job accepted by the server is set to be bound, the image former forms the page image based on the print job being accepted and the page image based on the print job accepted by the server, by allocating the page images in parallel such that a side to be cut by the cutter comes to a side to be bound at time of binding, and
a sheet, on which each of the page images is formed, is ejected after being distinguished depending on an orientation of the sheet.

16. The image forming system according to claim 1, wherein
regardless of whether or not the page image based on the print job being accepted and the page image based on the print job accepted by the server are formed to be allocated in parallel, the image former forms each of the page images such that a sheet, on which a page image based on a same print job is formed, is ejected in a constant orientation.

17. A non-transitory recording medium storing a computer readable control program of an image forming system, the image forming system including:
a server enabled to accept a print job from a client apparatus; and
an image forming apparatus that is enabled to receive an order for the print job from the server and includes a sheet feeding tray that accommodates a sheet and an image former that forms an image,
the control program causing a computer to execute:
(a) determining whether or not a first condition is satisfied, the first condition being that a print job accepted by the server specifies a sheet of a same size as a size of a sheet specified by a print job being accepted by the image forming apparatus and at least either being executed or scheduled to be executed;
(b) determining whether or not a second condition is satisfied, the second condition being that the sheet feeding tray accommodates a sheet of twice the size of the sheet specified;
(c) determining to receive an order for the print job accepted by the server in a case where the first condition is satisfied in (a) and the second condition is satisfied in (b); and
(d) controlling the image former to form a page image based on the print job accepted by the server and a page image based on the print job being accepted specifying the sheet of the same size as the size of the sheet specified, by allocating the page images in parallel to the sheet of twice the size of the sheet specified, in a case where it is determined to receive the order for the print job accepted by the server in (c).

18. The non-transitory recording medium storing a computer readable control program of an image forming system according to claim 17, wherein
the first condition is that the print job accepted by the server specifies a sheet of the same size and a same type as the size and a type as the sheet specified by the print job being accepted and at least either being executed or scheduled to be executed,
the second condition is that the sheet feeding tray accommodates a sheet of twice the size of the sheet specified and of the same type as the type of the sheet specified, and
in (d), the image former is controlled to form the page image based on the print job accepted by the server and a page image based on the print job being accepted specifying the sheet of the same size and the same type as the size and the type of the sheet specified, by allocating the page images in parallel to the sheet of twice the size of the sheet specified and of the same type as the type of the sheet specified.

19. A non-transitory recording medium storing a computer readable control program of an image forming apparatus,
the image forming apparatus being enabled to receive an order for a print job from a server accepting the print job from a client apparatus and including a sheet feeding tray that accommodates a sheet and an image former that forms an image,
the control program causing a computer to execute:
(a) determining whether or not a first condition is satisfied, the first condition being that a print job accepted by the server specifies a sheet of a same size as a size of a sheet specified by a print job being accepted by the image forming apparatus and at least either being executed or scheduled to be executed;

(b) determining whether or not a second condition is satisfied, the second condition being that the sheet feeding tray accommodates a sheet of twice the size of the sheet specified;

(c) determining to receive an order for the print job accepted by the server in a case where the first condition is satisfied in (a) and the second condition is satisfied in (b); and (d) controlling the image former to form a page image based on the print job accepted by the server and a page image based on the print job being accepted specifying the sheet of the same size as the size of the sheet specified, by allocating the page images in parallel to the sheet of twice the size of the sheet specified, in a case where it is determined to receive the order for the print job accepted by the server in (c).

20. A non-transitory recording medium storing a computer readable control program of a server, the server accepting a print job from a client apparatus and being enabled to place an order for the print job to an image forming apparatus, the control program causing a computer to execute:

(a) determining whether or not a first condition is satisfied, the first condition being that a print job accepted by the server specifies a sheet of a same size as a size of a sheet specified by a print job being accepted by the image forming apparatus and at least either being executed or scheduled to be executed;

(b) determining whether or not a second condition is satisfied, the second condition being that the sheet feeding tray of the image forming apparatus accommodates a sheet of twice the size of the sheet specified;

(c) determining to place an order for the print job accepted by the server to the image forming apparatus in a case where the first condition is satisfied in (a) and the second condition is satisfied in (b); and (d) controlling the image forming apparatus to form a page image based on the print job accepted by the server and a page image based on the print job being accepted specifying the sheet of the same size as the size of the sheet specified, by allocating the page images in parallel to the sheet of twice the size of the sheet specified, in a case where it is determined to place the order for the print job accepted by the server in (c).

* * * * *